United States Patent [19]

Cohen

[11] Patent Number: 5,303,378
[45] Date of Patent: Apr. 12, 1994

[54] REENTRANT PROTECTED MODE KERNEL USING VIRTUAL 8086 MODE INTERRUPT SERVICE ROUTINES

[75] Inventor: Leonardo Cohen, Spring, Tex.

[73] Assignee: Compaq Computer Corporation, Houston, Tex.

[21] Appl. No.: 703,499

[22] Filed: May 21, 1991

[51] Int. Cl.$^5$ .............................................. G06F 12/00
[52] U.S. Cl. ...................................... 395/700; 395/400; 364/280.8; 364/280.9; 364/DIG. 1
[58] Field of Search ............... 395/425, 650, 700, 400; 364/200, 900

[56] References Cited

U.S. PATENT DOCUMENTS

| | | | |
|---|---|---|---|
| 4,779,187 | 10/1988 | Letwin | 395/650 |
| 4,926,322 | 5/1990 | Stimac et al. | 395/500 |
| 4,928,237 | 5/1990 | Bealkowski et al. | 395/700 |
| 4,974,159 | 11/1990 | Hargrove et al. | 395/650 |
| 5,027,273 | 6/1991 | Letwin | 395/400 |
| 5,125,087 | 6/1992 | Randell | 395/425 |
| 5,144,551 | 9/1992 | Cepulis | 395/700 |

OTHER PUBLICATIONS

John Uffenbeck, Microcomputers and Microprocessors: The 8080, 8085, and Z-80 Programming, Interfacing, and Troubleshooting, 1985, pp. 257–273.
James Turley, "Advanced 80386 Programming Techniques", McGraw-Hill, 1988, pp. 283–315.

*Primary Examiner*—Gareth D. Shaw
*Assistant Examiner*—Dennis M. Butler
*Attorney, Agent, or Firm*—Pravel, Hewitt, Kimball & Krieger

[57] ABSTRACT

A method for allowing a protected mode kernel to service, in virtual 8086 mode, hardware interrupts which occur during execution of ring 0 protected mode code. When an interrupt occurs during execution of ring 0 code, the microprocessor copies the state of the last virtual 8086 environment on the top of the ring 0 stack and modifies this state to begin execution of the appropriate interrupt service routine in virtual 8086 mode. The kernel utilizes a secondary stack to keep track of the last virtual 8086 environment saved on the ring 0 stack and updates the ring 0 stack pointer in the respective task's task state segment to the new beginning of the ring 0 stack each time a ring transition occurs from ring 3 V86 mode to ring 0 protected mode. By manipulating the ring 0 stack and utilizing the secondary stack to keep track of interrupted V86 environments, the kernel can allow interrupts to be nested down multiple levels.

16 Claims, 18 Drawing Sheets

RING 3 STACK

RMTF
| VM EFLAGS BEFORE INT |
| CS OF VM TASK INTERRUPTED |
| EIP OF VM TASK INTERRUPTED |

RING 0 STACK

| VM DATA SEGMENTS |
| VM SS |
| VM ESP |
| VM EFLAGS |
| CS OF VM TASK INTERRUPTED |
| EIP OF VM TASK INTERRUPTED |
VMTF

FIG. 10
PRIOR ART

RING 3 STACK

RMTF
| VM EFLAGS BEFORE INT |
| CS OF VM TASK INTERRUPTED |
| EIP OF VM TASK INTERRUPTED |

RING 0 STACK

| VM DATA SEGMENTS |
| VM SS |
| NEW VM ESP (OLD ESP-6) |
| EFLAGS (IF + TF CLEARED) |
| CS OF VM INTERRUPT HANDLER |
| EIP OF VM INTERRUPT HANDLER |
VMTF

FIG. 11
PRIOR ART

RING 0 STACK

| VM DATA SEGMENTS |
| VM SS |
| VM ESP |
| VM EFLAGS |
| CS OF VM TASK INTERRUPTED |
| EIP OF VM TASK INTERRUPTED |
VMTF

FIG. 13

REENTRANT PROTECTED MODE KERNEL USING VIRTUAL 8086 MODE INTERRUPT SERVICE ROUTINES

BACKGROUND OF THE INVENTION

1. Field of the Invention

The present invention relates to operating systems in computer systems, and more particularly to an interruptible protected mode kernel which can service, in virtual 8086 mode, hardware interrupts which occur during execution of ring 0 protected mode code.

2. Description of the Prior Art

Many popular personal computers are based on the Intel Corporation (Intel) 8086 family of microprocessors. This microprocessor family includes the 8088, the 8086, the 80186, the 80286, the 80386, and the 80486 microprocessors, among others. These microprocessors have been designed for upward compatibility—programs written for the 8088 and/or the 8086 can be run on computers having 80286, 80386, or 80486 processors, and programs written for the 80286 processor can be run by the 80386 or the 80486. For the purposes of this disclosure, the upwardly compatible series of Intel processors and processors which include the instruction set of these processors is hereinafter referred to as the Intel 8086 family of microprocessors. Also, for the purposes of this disclosure, the 8088 and the 8086 may be considered functionally equivalent and will henceforth be referred to as "the 8086." In addition, the 80386 and 80486 microprocessors are considered functionally equivalent and will henceforth be referred to as "the 80386."

The amount of physical memory a microprocessor can access depends on the number of address lines that emanate from the chip. Each additional bit doubles the amount of addressable memory. The 8086 can address one Megabyte of memory, which requires a 20-bit address. Rather than introduce a 20-bit register into the 8086, the 20-bit address is split into two portions—a 16-bit segment address and a 16-bit offset address, which are stored in different registers. The microprocessor shifts the segment address 4 bits left (thereby effectively multiplying it by 16) and then adds the offset address. The result is a 20-bit address that an access 1 Megabyte of memory.

By convention, a 20-bit address can be shown broken down into its segment and offset parts using the notation 0000:0000, the segment being to the left of the colon and the offset on the right. For example, a 20-bit address written as FFE6E in hexadecimal notation could be written as FFE4:002E in segmented notation. Each of the four segment registers in the 8086 defines a 64 KB block of memory called a "segment." If all the segment registers are kept constant and equal, then the microprocessor can access only 64 kbytes of memory.

The 80286 and the 80386 microprocessors all support and go beyond the segmented addressing scheme of the 8086. When first powered up, they operate in "real mode," which uses segment and offset registers in the same way as the 8086 to access the same one Megabyte of memory. Thus the 80286 and the 80386 microprocessors are upwardly compatible with the addressing scheme of the 8086 chip.

In addition to real mode operation, the 80286 and the 80386 can operate in "protected mode." The main difference of protected mode is that the segment register is no longer a real (i.e., physical) address. Instead, the 80286 and 80386 microprocessors use the value held in the segment register to look up a base address which is stored in a descriptor table in memory. The 80286 utilizes a 24-bit base address, which allows the 80286 to access 16 Megabytes of memory ($2^{24}$) instead of 1 Megabyte ($2^{20}$). The 80286 adds a 16-bit offset address to this base address to form a 24 bit address. The 80386 utilizes a 32-bit base address and a 32-bit offset to form a 32-bit address, which allows the 80386 to access 4 gigabytes of memory.

In order to more fully understand the present invention, there follows a discussion of the way in which the 80386 microprocessor addresses memory.

The physical address space of most computers is organized as a simple array of bytes. With the development of memory management units (MMU's), computer architectures began to distinguish between the physical address space implemented by the memory hardware and the logical address space seen by a programmer. The MMU translates the logical addresses presented by programs into the physical addresses that are provided from the microprocessor. The 80386 logical address space consists of a collection of one of the following:

Bytes: The logical address space consists of an array of bytes with no other structure (this is sometimes called a "flat" or "linear" address space). No MMU translation is required because of a logical address is exactly equivalent to a physical address.

Segments: The logical address space consists of a few or many segments, each of which is composed of a variable number of bytes. A logical address is given in two parts, a segment number and an offset into the segment. The MMU translates a logical address into a physical address.

Pages: The logical address space consists of many pages, each of which is composed of a fixed number of bytes. A logical address is a page number plus an offset within the page. The MMU translates a logical address into a physical address.

Paged Segments: The logical address space consists of segments which themselves consist of pages. A logical address is a segment number and an offset. The MMU translates the logical address into a linear address which is then translated by the paging mechanism into a physical address.

Technically, the 80386 views memory as a collection of segments that are optionally paged. In practice, the 80386 architecture supports operating systems that use any of the four views of memory described above. There follows a more detailed discussion of the segmentation and paging mechanisms in the 80386 microprocessor.

In protected mode, the segment is the unit the 80386 provides for defining a task's logical address space. Segment registers define the way that memory is organized between tasks, that is, a task's logical address space consists of one or more segments. An instruction refers to a memory operand by a two-part logical address consisting of a segment selector and an offset into the segment. The 80386 uses the selector to look up the segment's descriptor in a segment descriptor table, and the base address in the descriptor is added to the offset to produce the operand's linear address. In this manner, the segmentation unit in the 80386 translates a logical address into a linear address.

Each task has its own descriptor table describing the segments for that task, and that (along with 80386 register values) is virtually all that the 80386 needs to store to switch between tasks. Since addresses are stored in the descriptor table rather than in the segment registers, the operating system can move memory around without application programs being affected.

Unlike the 8086, 8088, and 80286, the 80386 microprocessor incorporates memory paging hardware. This allows linear addresses to be mapped to physical memory addresses. This facility allows the efficient implementation of virtual memory systems. With memory paging support, the operating system can easily allocate contiguous memory to an application simply by mapping a number of noncontiguous physical memory pages into the requested logical program space. This mapping of a program's linear address space into physical memory is shown schematically in FIG. 1.

The mapping of noncontiguous physical memory pages into a requested logical program space is performed by updating the page directory and page tables. An 80386 operating system enables paging by setting the PG (Paging Enabled) bit in Control Register 0 (CR0) with a privileged instruction. When paging is enabled, the processor translates a linear address to a physical address with the aid of page tables. Page tables are the counterparts of segment descriptor tables; as a task's segment descriptor table defines its logical address space, a task's page tables define its linear address space. An 80386 task's page tables are arranged in a two-level hierarchy as shown in FIG. 2. Each task can have its own page table directory. The 80386's CR3 (Page Table Directory Base) system register points to the running task's page table directory. The 80386 updates CR3 on each task switch, obtaining the new directory address from an area of memory associated with that task referred to as the task state segment (TSS). FIG. 2 shows in functional terms how the 80386 microprocessor translate a linear address to a physical address when paging is enabled. The processor uses the upper 10 bits of the linear address as an index into the directory. The selected directory entry contains the address of a page table. The processor adds the middle 10 bits of the linear address to the page table address to index the page table entry that describes the target page. Adding the lower 12 bits of the linear address to the page address produces the 32-bit physical address.

FIG. 3 shows the basic content of a page table entry. Directory entries are identical, except that the page address field is interpreted as the physical address of a page table, rather than a page.

Tasks can share individual pages or entire page tables. Entries in different page tables that point to the same page are aliases of one another just as descriptors with the same base address are aliases of one another. The 80386's two-level page table structure makes it easier to share pages between tasks by sharing entire page tables. Since the address of a page shared in this way exists in a single page table, the operating system has one page table entry to update when it moves the page. This phase of address transformation implements the basic features needed for page-oriented virtual memory systems and page-level protection. FIG. 6 illustrates how the 80386 paging mechanism can manage memory for multiple virtual-8086 mode machine simulations concurrently with protected mode applications, which is explained more fully below.

Therefore, the segmentation unit of the 80386 translates a logical address as seen by the programmer to a linear address. If paging is not enabled, the processor considers the linear address formed from the segment:-offset to be the physical address and provides it on the address pins. If paging is enabled, the 80386 translates the linear address into a physical address with the aid of page tables. The page translation step is optional, and paging must be enabled if the operating system is to implement multiple virtual 8086 tasks, page-oriented protection, or page-oriented virtual memory. FIG. 4 shows the fundamentals of 80386 logical-to-physical address translation.

In addition to the on-chip memory management feature discussed above, the 80386 includes a protection scheme in order to support multitasking. The 80386 protection mechanism consists of two parts: the memory management scheme discussed above, which is used to protect various tasks from each other, and privilege level protection, which is used to selectively protect various portions of the operating system and other software from user applications. As explained above, the memory management abilities of the 80386 provides for the separation of task address spaces by segment descriptor tables and page tables. This separation can effectively prevent application tasks from interfering with each other's code and data. In addition to isolating tasks from each other, the privilege level protection mechanism provides facilities for protecting the operating system from application code, for protecting one part of the operating system from other parts, and for protecting a task from some of its own errors.

Referring now to FIG. 5, the privilege level protection facilities of the 80386 are based on the notion of a privilege hierarchy. The 80386 microprocessor has four levels of protection which can support the needs of a multitasking operating system to isolate and protect user programs from each other and the operating system. In this description, privilege levels are also generally referred to as rings, and they are numbered 0 through 3. Ring 0 is the most privileged level and ring 3 is the least privileged level.

FIG. 5 shows how the 80386 privilege levels can be used to establish different protection policies. An unprotected system can be implemented by simply placing all procedures in a segment (or segments) whose privilege level is 0. Real mode is an example of an unprotected system because the operating system (OS) and all of the various procedures and applications are operating at ring 0 level. In contrast, protected mode utilizes the full privilege and protection capabilities of the 80386. For example, in protected mode, the most critical and least changing operating system procedures (referred to as the operating system kernel) are assigned to ring 0. Ring 1 is generally used for the services that are less critical and more frequently modified or extended, for example, device drivers. Ring 2 may be reserved for use by original equipment manufacturers (OEM's). Such OEM's could then assign their code privilege level 2, leaving ring 3 for the end users. In this way, the OEM software is protected from the end users; the operating system is protected from both the OEM and the end users; and, the operating system kernel is protected from all other software, including that part of the operating system that is subject to frequent change.

Therefore, protected mode is so named because segments belonging to one task are protected from being corrupted by another task. Tasks are organized in privilege levels, and certain machine-code instructions are prohibited to lower privilege levels: In a well-designed protected-mode operating system, a single program or task cannot compromise the system's integrity.

On the 80286 and 80386 microprocessors, the basic unit of a multitasking system is the task. A task can be defined as either a single program or a group of related programs operating in the computer system. The 80286 and 80386 microprocessors include a special segment referred to as a task state segment, or TSS, assigned to each task. The TSS contains important information about a task. The 80286 and 80386 processors use the TSS to store a task's vital information when the task is not running. The processor retrieves the information necessary to restart the task from the TSS when the task's turn comes again. Therefore, the TSS supports task suspension and resumption by holding a complete image of the register state of the task while the task is inactive. When a task is suspended, the current processor register values are written into fields in the TSS. When a task is resumed, the registers are loaded from the values saved in the TSS to reestablish the state of the task. This allows the task to resume execution as if it were never suspended.

In addition to the register save area discussed above, the TSS includes a back link field which is used by the processor to keep track of a task chain for task switching or multitasking purposes. A task switch occurs when a task executes a CALL instruction that references another task or if an interrupt occurs which specifies handling with a task switch. The back link field is used with the nested task (NT) bit in the 80386's EFLAGS register to link the TSS's for tasks suspended by CALL instructions or interrupts.

Each of the privilege levels or rings discussed above includes a separate stack which programs use when they are operating at that privilege level. Each protection level includes it own stack to avoid protection problems which might occur in a shared stack. The TSS for each task includes an inner-level stack pointer SS:ESP for each of the inner levels 0, 1, and 2 which are used to initialize the respective inner level stack when a privilege level change or ring transition to an inner level occurs. The SS:ESP values which point to the beginning of the respective inner level stack are taken from the TSS and loaded into the SS and ESP register to begin operation at the proper location in the inner level stack. Therefore, unless a respective inner-level stack pointer is modified, inner-level transitions initialize the inner stack to the same point, always starting with a "fresh" stack on each inner transition.

A task's privilege level determines what instructions it may execute and what subset of the segments and/or pages in its address space it may reference. At any instant, a task's privilege is equal to the privilege level of the code segment it is executing. In each segment descriptor is a field that defines the privilege level of the associated segment. The field may take one of four values. The processor checks for consistency between a task's privilege level and the privilege level of the segment or page that is the target of an instruction. Any attempt by a task to use a more privileged segment or page makes the processor stop execution of the instruction and raise a general protection (GP) exception.

In addition to defining which segments and pages it can use, a task's privilege level defines the instructions it can execute. The 80386 has a number of instructions whose execution must be tightly controlled to prevent serious system disruption. These instructions are referred to as privileged instructions, and they are allowed only if the program which includes the instructions is running at privilege level or ring 0. All of the instructions that load new values into the system registers are examples of privileged instructions. Other examples of privileged instructions are instructions that modify the interrupt flag, alter the segmentation, or affect the protection mechanism.

The descriptors in a task's Local Descriptor Table (LDT) and Global Descriptor Table (GDT) define the task's logical address space. The segments defined in these tables are theoretically addressable, because the descriptor tables provide the information necessary to compute a segment's address. However, an addressable segment may not be accessible to a particular operation because of the additional protection checks made by the protection mechanism in the 80386. The 80386 checks every segment reference (whether generated by the execution of an instruction or an instruction fetch) to verify that the reference is consistent with the protection attributes of the segment. In order to access a segment, a program must be at least as privileged as the segment. For example, a program running at level 3 can only reference segments whose privilege level is also 3, while a program running at level 0 can access all segments in its logical address space.

Systems that do not make extensive use of segments can instead protect pages. (Page protection can also be applied to sections of large segments.) Like a descriptor, a page table entry has a set of protection attributes. The 80386 checks every reference to the page for conformance to these attributes. The 80386 microprocessor checks the protection attributes of a page after verifying that an access is consistent with the segment attributes. Thus, page protection is a convenient way for an operating system to apply additional protection to portions of a segment. For example, an operating system can safely store task-related operating system data, such as page tables and file descriptors, in a task's data segment by designating the pages containing the respective data supervisor pages.

Since its commercial introduction in 1981, the IBM PC from International Business Machines Corp., and various compatible units, and the primary operating system, MS-DOS, have found immediate acceptance and widespread use throughout the world. (MS-DOS is a trademark of Microsoft Corporation of Bellevue, Wash.) The IBM PC utilized the 8088 microprocessor. Consequently, an enormous amount of software has been developed to operate on 8086-based machines running MS-DOS or some variation. When Intel introduced the 80286 in 1983, it was widely used by personal computer makers as the next generation microprocessor succeeding the 8086. The 80286 represented a major leap over the 8086 in performance capabilities, principally due to its new protected mode of operation. Unfortunately, the large amount of software written for 8086-based computers was unable to take advantage of the new protected mode features of the 80286, but rather had to be run in real mode. Consequently, the great majority of 80286-based computer systems were run in real mode, and the high performance features of protected mode largely remained untapped. In addition, multitasking was impractical when the 80286 was operated in real mode because real mode only recognizes one Mbyte of memory and, in addition, real mode operates all software, including the operating system, in the most privileged level of the processor and therefore provides no protection mechanisms to protect the integrity of different programs or tasks.

In order to overcome these shortcomings, Intel introduced the 80386 microprocessor which, in addition to the enhancements previously discussed, including a 32-bit architecture and a paging memory management unit (MMU), includes an additional mode of operation known as virtual 8086 mode or V86 mode. V86 mode is an 8086 emulation mode that is somewhat of a hybrid between real mode and protected mode. Within protected mode, software can perform a task switch to enter into tasks designated as V86 tasks. A task is designated as a V86 task when the VM flag (bit 17) in the EFLAGS register is set. Software that was formerly run in real mode can now be run in virtual 8086 mode as a V86 task. V86 tasks behave with 8086 semantics, thus allowing 8086-compatible, real mode software to execute.

Real mode applications software was originally written for a DOS environment which included no protection mechanisms. Therefore, real mode software is accustomed to having complete access to all of the operating system services necessary for operation. In a similar manner, V86 mode includes none of the memory protection or privilege mechanisms discussed above. Instead, the 80386 enforces a type of group privilege level on all V86 tasks. In order to protect the host operating system and the various protected mode services from DOS applications that are used to running in real mode, V86 tasks are run in ring 3 or the least privileged level. This prevents real mode applications running as V86 tasks from having direct access to the hardware and other protected system services. This facilitates the ability of an operating system to manage all accesses to hardware in order to support a multitasking or task switching environment which includes multiple 8086 applications.

In V86 mode, the 80386 treats the segment registers the same way as in real mode, where they represent real (i.e., physical) addresses. Thus, existing DOS programs (and DOS itself) can operate in the conventional manner with segment registers and not run into the problems associated with protected mode. The addresses from multiple virtual 8086 sessions do not collide when they access physical memory because, when the 80386 processor adds the segment and offset registers together, they create not a physical address, but a linear address. The paging mechanism of the 80386 is operative in V86 mode to translate the linear address into a physical address, which may be anywhere in the 4 gigabytes of the 80386 processor's addressable memory.

Using the 80386 memory paging functions, the operating system can manage memory for multiple V86 mode machine simulations concurrently with protected mode applications. Memory paging can also be used to allow each 8086 machine simulation to have access to common routines and data, such as a system ROM, by making the physical ROM appear in the memory space of each simulated machine. Actually, only one ROM exists, but each machine sees it as the expected address within its 1 Mb address space.

FIG. 6 shows how the 80386 paging mechanism enables multiple virtual 8086 machines to be managed. A single copy of the 8086 operating system (DOS) is made to appear in the address space of both machines. The paging mechanism gives each virtual 8086 task a 1 Mb linear address space. Read-only areas, such as the 8086 operating system, can reside on shared pages used by all virtual 8086 tasks. Unused pages can be omitted from physical memory. Therefore, use of the paging mechanism in V86 mode permits the 80386 processor to imitate multiple 8086-based machines while it is also running in protected mode. As the name implies, the 80386 can mimic a 1 Megabyte addressing environment that to existing programs appears to be an 8086. But unlike real mode, more than 1 Mbyte is available. The 80386 processor can actually maintain more than one V86 environment in memory at the same time. Each of these environments can have its own copy of the operating system and an application program. At the same time, a protected mode application can be using a different area of memory. In this manner, multitasking of real mode and protected mode applications is possible.

In general, the concept behind providing V86 mode in the 80386 microprocessor was to allow a protected mode kernel, which could be a full power operating system such as OS/2 or UNIX, to run multiple real mode applications, including DOS, as well as protected mode applications in a multitasking or task switching environment. The protected mode kernel or operating system would run in protected mode, but would place the 80386 into V86 mode to run real mode DOS applications as V86 tasks.

However, it is unnecessary to require a full-fledged operating system in order to take advantage of the V86 mode of the 80386. Instead, all that is generally required to take advantage of the V86 mode are the very essential elements or kernel of an operating system. A protected mode kernel that runs in protected mode but is able to run real mode DOS applications as V86 tasks is referred to as a virtual DOS monitor. An example of a virtual DOS monitor is a software program called Compaq Expanded Memory Manager (CEMM), which utilizes a virtual DOS monitor and the paging mechanism of the 80386 to emulate expanded memory in software using extended memory. A description of the operation of CEMM is described in U.S. Pat. No. 4,926,322 titled "Software Emulation of Bank-Switched Memory Using a Virtual DOS Monitor and Paged Memory Management." Other software programs which include virtual DOS monitors are Windows 3.0 from Microsoft Corp. and Quarterdeck Expanded Memory Manager (QEMM) from Quarterdeck Corp.

As previously discussed, V86 mode tasks run in ring 3 level or the least privileged level of the processor to prevent these V86 mode tasks from having complete access to hardware and various protected services in the system. However, since V86 tasks are essentially real mode applications, they were designed to run in an unprotected system and hence have access to all of the system services they require. Because V86 tasks run at ring 3 level, they are unable to access the real mode DOS services that DOS applications generally require. Therefore, one of the primary tasks of a virtual DOS monitor (VDM) is to track any request for DOS services by V86 tasks and then emulate some of those services. The DOS services required would not actually be performed by DOS, but rather would be emulated by the VDM. Therefore, in summary, a virtual DOS monitor emulates the services provided by an Intel 8086 family microprocessor based computer running the MS-DOS operating system in real mode for a V86 task that is running in virtual 8086 mode because the V86 task is running at ring 3 level and is unable to access the DOS services it requires. The emulation is accomplished using the virtual 8086 mode of the 80386 microprocessor.

The VDM itself executes in the protected mode of the microprocessor. Its principal functions are: hardware and software interrupt reflection; input/output (I/O) instruction trapping; emulation of privileged instructions; provision of a communication interface between virtual-mode tasks running under the VDM and the VDM itself; and handling of system protection violations and error conditions. In this manner, the VDM is similar in functionality to the kernel of a simple operating system. The VDM allows an MS-DOS real mode program to execute within the virtual 8086 mode of an 80386 processor, which provides an 8086 execution environment.

In order to more fully understand the present invention, a discussion of interrupt handling techniques used by virtual DOS monitors is deemed appropriate. For a more complete discussion of interrupt handling techniques used by VDM's, please refer to U.S. Pat. No. 4,926,322 to Stimac, et al., which is hereby incorporated by reference. In the following discussion, interrupts and exceptions are referred to collectively as exceptional conditions. Exceptional conditions are further classified as hardware and software interrupts and exceptions. A hardware interrupt is an event asynchronous to the processor which indicates that a hardware device requires service. A software interrupt occurs when an INT instruction is executed and is otherwise similar to a hardware interrupt. Exceptions are unusual or invalid conditions detected during the execution of an instruction. In IBM-compatible computers based on the industry standard architecture (ISA) as originated in the IBM PC/AT, there are generally 16 hardware interrupts, 16 exceptions, and 256 software interrupts.

A VDM employs a technique referred to as "interrupt reflection" to simulate the action of a real-mode software or hardware interrupt for a task which is running in V86 mode. When an exceptional condition occurs in a V86 task, the 80386 automatically switches from V86 mode to protected mode. In handling an exceptional condition, in many instances a determination must first be made as to whether the external event which occurred in the V86 program was a hardware interrupt, a software interrupt, or an exception. The original Intel 8086 architecture allowed for 256 interrupts referred to as interrupts 0–255, but they reserved 0–31 for exceptions for their own internal use. However, when International Business Machine Corp. (IBM) introduced its first computer, the IBM PC, it was architected such that hardware interrupts were mapped in at the same interrupt level or number as these reserved exceptions. More specifically, the master programmable interrupt controller (PIC) on the IBM PC generated interrupts 8–15 in response to interrupt request lines (IRQ's) 0–7. Unfortunately, these interrupt locations conflict with 80386 exceptions 8–15. As a result, there was a conflicting usage of interrupt vector table (IVT) entries for exceptions and for interrupts because they are each mapped to the same interrupt numbers. In order to maintain compatibility with the IBM PC, subsequent developers have been forced to map hardware interrupts into the area that conflicts with exceptions. Consequently, a determination between whether an interrupt or an exception has occurred is often difficult. Therefore, when an exceptional condition occurs in a V86 program such that the interrupt number generated could represent an interrupt or an exception, the respective protected mode interrupt handler must determine whether the exceptional condition was a hardware or software interrupt or an exception.

One method that has been used to differentiate between interrupts and exceptions in a non-reentrant protected mode kernel was described in U.S. Pat. No. 4,926,322 referenced above, hereafter referred to as the CEMM patent. In the VDM described in the CEMM patent, most software interrupts were designed to generate general protection (GP) faults and thus to enter the VDM protected mode GP fault handler. Due to the larger number (256) of software interrupts, most software interrupts were funneled through the GP fault handler to obviate the necessity of having 256 different protected mode entry points and 256 different protected mode interrupt handlers.

The GP fault handler included code to distinguish between whether the condition which caused the processor to enter the GP fault handler was a software interrupt or a general protection exception. This code determined the respective instruction which caused the condition. If the instruction which resulted in the exceptional condition was an INT instruction, then the condition was a software interrupt. If not, then the condition was a GP exception, and the GP fault exception handler routine was executed. If the exceptional condition was determined to be a software interrupt, then code in the GP fault handler determined which interrupt number was generated. This code is necessary because the "funnelled" software interrupts all enter the GP fault handler through the same entry point, and thus there is no longer a unique entry point for each software interrupt. If the interrupt requested a real mode interrupt service routine, the code would reflect the interrupt back to the respective real mode ISR, which would then be executed as a V86 task. The method used to reflect interrupts is described further below. Software interrupts which request protected mode services generally were not funneled through the GP fault handler, but preferably had their own entry point. Therefore, the VDM described in the CEMM patent solved the problem of overlapping software interrupts and exceptions by forcing most software interrupts to generate a GP fault and enter through the GP exception handler. For more information on the method used to distinguish between software interrupts and exceptions, please refer to the CEMM patent.

The VDM described in the CEMM patent used a different method to distinguish between hardware interrupts and exceptions. When an exceptional condition occurs, the 80386 performs a ring transition from ring 3 to ring 0 and begins using the ring 0 stack. The 80386 first saves the state of the interrupted V86 task, which includes the virtual mode data segments, SS, ESP, EFLAGS, and CS:EIP of the interrupted V86 task, on top of the ring 0 stack as shown in FIG. 7. In the following discussion stacks grow downward in memory, and the "top" of the ring 0 stack is visually the bottom of the stack. The above variables saved on the ring 0 stack represent the saved state of the V86 task and are referred to as the virtual mode trap frame (VMTF). This process of saving the state of the current V86 task on the ring 0 stack is described more fully below. The method described in the CEMM patent used the fact that, when an exception occurs, the 80386 automatically adds an error code or value at the end of the ring 0 stack after the VMTF described above. When the ring transition occurs from ring 3 to ring 0, the TSS keeps track of where the ring 0 stack is located through its ring 0 stack pointer variable SS:ESP. If an exception occurred, then, as shown in FIG. 7, the ring 0 pointer SS:ESP would point to the error code, as shown. However, if an interrupt had occurred, than SS:ESP would be pointing to the last value of the VMTF (EIP) because no error code would be present. Therefore, the VDM described in the CEMM patent utilized the ring 0 stack pointer variables SS:ESP to determine if an error code was added to the end of this ring 0 stack after the VMTF. If so, then the exceptional condition which caused the ring transition was an exception. If no error code is present, then the exceptional condition was an interrupt.

Since the top of the ring 0 stack is a known value, (it is taken from the TSS when the transition from virtual mode to protected mode occurs), checking for the presence of the error code is simply a matter of measure the depth of the stack. The stack is one word (the error code) deeper when the exceptional condition was caused by a processor exception than when it was caused by a hardware interrupt. If the exceptional condition is determined to be an exception, then the VDM handles the exception through a protected mode exception handler, and no reflection back to V86 mode is required. If the exceptional condition is determined to be a hardware interrupt, then the protected mode interrupt handler vectors off to interrupt reflection code which reflects the interrupt to the appropriate interrupt service routine that would have been invoked had the interrupt occurred in real mode.

The VDM uses interrupt reflection to cause the result of a real mode hardware or software interrupt, generated in connection with a virtual mode task, to be the same as with a real-mode task. Interrupt reflection enables the protected mode interrupt handler to emulate DOS services in real mode and invoke real mode ISR's in V86 mode. Through interrupt reflection, V86 tasks can operate identically to real mode. This permits the proper operation of the system ROM interrupt handlers, of real mode operating system interrupt handlers (e.g., those associated with MS-DOS), and real mode applications which trap interrupts. Because knowledge of interrupt reflection is important in understanding the present invention, a description of its operation follows. For a more detailed description of interrupt reflection, please refer to U.S. Pat. No. 4,926,322 to Stimac, et al. (the CEMM patent), which was referenced above.

In understanding interrupt reflection, it is useful to examine the difference between the effects of a hardware interrupt in V86 mode and in real mode. In real mode on the 80386, for example, a hardware interrupt proceeds as follows. The processor suspends execution of the currently executing task at the address specified by the current contents of the code segment (CS) register and the instruction pointer (IP) register. The processor pushes the current contents of the FLAGS register, the CS, and the IP register onto the real mode stack, as defined by the real mode stack segment (SS) and the stack pointer (SP) registers. These values are pushed onto the stack in the order just described, as illustrated in FIG. 8. These values are referred to as the real mode trap froma (RMTF).

The 80386 then determines the beginning execution address for the respective interrupt service routine (ISR) via the interrupt vector table (IVT) in low memory. The IVT may generally be defined as the real mode version of the Interrupt Description Table (IDT), which is explained below. The beginning address is determined by the respective interrupt vector in the IVT corresponding to the respective interrupt number generated. Finally, the processor clears the interrupt flag (IF) and trace flag (TF) bits in the current flags register and continues execution at the beginning address of the respective interrupt service routine. In short, the processor in real mode saves the current flags and the CS and IP registers on the real mode stack and dispatches the appropriate ISR with the IF and TF bits cleared. The processor remains in real mode throughout this process.

Interrupts are handled somewhat differently in V86 mode. In V86 mode, when the 80386 receives a hardware interrupt, it first performs a ring transition or switch from ring 3 V86 mode to ring 0 where the interrupt handler of the VDM is located in protected mode. Protected mode interrupt handlers must operate in ring 0 to ensure that the IRET instruction at the end of the handler will execute at ring 0. This is necessary because only an IRET instruction executed in ring 0 has the privilege required to alter the VM (virtual 8086 mode) bit in the EFLAGS register to properly return to V86 mode.

Referring now to FIG. 9, as previously described, an interrupt in V86 mode causes the 80386 to perform a ring transition from ring 3 to ring 0. As a consequence of performing a ring transition from ring 3 to ring 0, the 80386 begins using all of the ring 0 resources, one of which is the ring 0 stack. Therefore, because the interrupt handler executes at ring 0 of protected mode, the stack on which the current V86 environment is saved is the ring 0 stack. The 80386 locates the current task's TSS and reads the ring 0 stack selector and stack pointer SS:ESP in order to utilize the ring 0 stack. It then pushes all of the virtual mode segment registers, shown in FIG. 9 as the data segments and the SS, onto the ring 0 stack. The 80386 then pushes the ESP from the V86 environment onto the ring 0 stack. The 80386 then pushes the current EFLAGS, CS, and EIP onto the ring 0 stack. It should be noted that all 32 bits of the EIP and EFLAGS registers are necessarily saved on the ring 0 stack because, otherwise, the 32-bit protected mode interrupt handler might alter the upper half of either register. As shown in FIG. 9, the virtual mode data segment registers, SS, ESP, EFLAGS, CS, and EIP saved on the ring 0 stack are referred to as the virtual mode trap frame (VMTF). The virtual mode or ring 3 stack, as determined by the virtual mode task's SS:SP at interrupt time, is not altered.

Since the 80386 is now in protected mode, the beginning address of the interrupt handler is not determined by reference to the interrupt vector table located in low memory, but instead by an entry in the system's Interrupt Descriptor Table (IDT). The IDT contains an entry for each valid interrupt in the system. If the interrupt which occurred was a software interrupt, then the software interrupt might be funneled through the GP fault handler, as was described above. If the interrupt which occurred was a hardware interrupt then the required interrupt service routine will necessarily be a real mode ISR. Therefore, the protected mode interrupt handler must have a means to dispatch the real mode ISR in V86 mode. As previously mentioned, as a general rule, all interrupts and exceptions which occur in V86 mode must be handled by ring 0 code. More specifically, if a particular interrupt handler could ever be invoked while a V86 program was running, the handler must generally be placed in a ring 0 code segment to allow the IRET instruction enough privilege to set the VM bit in the EFLAGS register to return to V86 mode. However, in many instances, such as where real mode services are required, it is necessary to service an interrupt in V86 mode because the real mode ISR required to service the interrupt can only exist in a V86 task.

One way a programmer might choose to execute a real mode ISR in V86 mode is for the protected mode interrupt handler to invoke the real mode ISR directly through a task gate. This method involves placing a task gate descriptor into the IDT slot corresponding to the respective interrupt or exception. In this manner, the 80386 processor would go to the respective slot in the IDT and vector to a task gate that switches to another V86 task.

However, a problem arises if a task gate is used to switch from a protected mode task to a V86 task. Whenever an interrupt or exception causes a task switch like this, the 80386 automatically sets the NT (Nested Task) bit in the new task's EFLAGS register, signifying that this task is nested inside another. The new task's TSS will also get a new back link field identifying the parent task. This way, the 80386 can determine whether a subsequent IRET instruction should return to another task or to code within the same task. Unfortunately, the NT bit is checked only when the IRET instruction is executed in protected mode. The NT bit is ignored in V86 mode. The net result is that an IRET instruction can be used only to set the VM (virtual mode) bit in the EFLAGS register, not clear it, and therefore a V86 task cannot return to its parent task with an IRET instruction. Therefore, since the only way to invoke a real mode service in V86 mode directly is through a task gate, and because nested V86 tasks cannot return to their callers properly, then it seems that protected mode tasks are required to service interrupts which occur during V86 mode.

However, even though the interrupt handler must run in protected mode, interrupt reflection techniques have been developed to allow the protected mode interrupt handler to invoke a V86 program or task. The V86 task which is invoked is the real mode ISR required to service the interrupt. Interrupt reflection entails manipulation of the ring 0 and virtual mode stacks to cause results like a real mode interrupt action for the virtual task. The desired end result is virtual mode execution of the respective interrupt service routine as determined by the interrupt vector table, using the same stack contents and entry flags as would have existed if the interrupt had occurred in real mode. To achieve interrupt reflection on an 80386, the VDM's interrupt reflection code performs the following steps within the protected mode interrupt handler.

As previously described, when an interrupt or exception occurs, the 80386 switches from ring 3 V86 mode to ring 0 protected mode and saves a VMTF on the ring 0 stack, as shown in FIG. 9. Referring now to FIG. 10, the FLAGS, CS, and IP are copied from the ring 0 stack onto the ring 3 stack used by V86 programs. These values are copied onto the ring 3 stack to emulate what the 80386 would normally do in real mode. The values are saved on the ring 3 stack so that upon completion of the real mode ISR, the 80386 can perform an IRET instruction and return to execution of the V86 task in the same V86 environment as when the interrupt occurred. The virtual mode or ring 3 stack segment (SS) and stack pointer (ESP), which reside in the ring 0 stack, are modified to point to the new "end" of the ring 3 stack to further emulate what would have occurred in real mode. This is necessary so that subsequent variables stored on the ring 3 stack during execution of the real mode ISR do not overwrite the saved state of the V86 task stored on the ring 3 stack.

The interrupt which occurred in the V86 program causes the 80386 to index into an entry point in the IDT. Depending on the entry point indexed in the IDT, the 80386 knows what actual interrupt number occurred and vectors to the appropriate protected mode interrupt handler. The interrupt handler then invokes interrupt reflection code that is used to reflect the interrupt to the requested real mode ISR. The interrupt reflection code determines the beginning address for the real mode ISR via the appropriate interrupt vector in the interrupt vector table. The code replaces the CS and IP on the ring 0 stack with CS and EIP values which point to the beginning of the real mode ISR. The code also clears the IF and TF bits in the EFLAGS value in the ring 0 stack to mimic what is done by the 80386 if it were in real mode. At this point, the ring 0 and ring 3 stacks would appear as in FIG. 11.

At this point, the VDM's protected mode interrupt handler executes an IRETD instruction to return to V86 mode and execute the real mode ISR. When the IRETD is executed, the 80386 pops the register values off of the ring 0 stack and returns to V86 mode. The 80386 begins execution at the address pointed to by the CS:EIP value which was popped off the ring 0 stack. Since the CS:EIP value was modified to point to the beginning address of the real mode ISR, the 80386 executes the real mode ISR which was required to service the interrupt which occurred in the original V86 program. The 80386 enters V86 mode to perform the ISR in the essentially the same state as when the original V86 program left V86 mode due to the interrupt. When the ISR is completed, the 80386 executes an IRET instruction, which pops the saved state of the interrupted V86 task off of the ring 3 stack, and the original V86 task resumes operation. Therefore, what actually has occurred is that the VDM has emulated in software what the 80386 microcode would normally do in real mode. The VDM code has emulated DOS to reflect an interrupt to the appropriate ISR which would have been executed had the 80386 been in real mode.

In summary, the implementation of the VDM's interrupt reflection logic comprises the following general steps. The processor interrupts a virtual mode task, saves the state of the virtual mode task on the ring 0 stack, and begins execution of the VDM's interrupt handler in ring 0 of protected mode. The VDM's interrupt handler manipulates the virtual mode ring 3 stack to emulate the action of a real mode interrupt and modifies the ring 0 stack to contain the appropriate entry conditions for the real mode ISR requested by the interrupt. The VDM then executes an IRETD instruction, and the processor returns to virtual mode and executes the interrupt service routine in V86 mode with the same entry conditions that would have existed had the interrupt occurred in real mode. Therefore, the VDM described in U.S. Pat. No. 4,926,322 included an interrupt handler wherein, if a real mode ISR was requested by a V86 task, the interrupt handler would manipulate the ring 0 stack so that the ISR could be executed in V86 mode. The manipulation of the ring 0 stack by the protected mode interrupt handler to invoke a real mode ISR in V86 mode is what is meant by interrupt reflection.

According to the VDM described in the CEMM patent, when a V86 task generates a software interrupt to request a protected mode service, the interrupt handler invokes the protected mode service, which is then executed in ring 0 protected mode to service the interrupt. At the end of the protected mode service, the 80386 performs an IRET instruction, which transfers control back to the interrupted V86 mode task. However, a problem arose in that the protected mode kernel forming the VDM in the CEMM patent was not interruptible when a protected mode service was being executed. During the entire time that the protected mode service was being executed, interrupts were not enabled because the kernel was unable to handle an exceptional condition while it was in protected mode. Therefore, if an interrupt came in during the time that the protected mode service was executing, the interrupt would not be acknowledged until after the protected mode service was completed. Problems arose because many of the protected mode services required a considerable length of time to execute, and therefore the interrupt latency during a protected mode service became unbearable. For example, if a high speed communications device connected to the computer system was attempting to communicate with the system during this time, the device could possibly attempt to interrupt the system several times during execution of the protected mode service while interrupts were not enabled. If the first interrupt was not acknowledged before a second interrupt was generated, then the system would possibly lose data from the device. Therefore a method is needed to allow a protected mode kernel to be interruptible or reentrant during execution of ring 0 protected mode code to reduce interrupt latency and prevent errors from occurring.

Background on DOS extenders and the VCPI interface is deemed appropriate. As previously mentioned, DOS provides computer systems with certain memory constraints, namely that DOS only recognizes one Megabyte of memory. Before the introduction of VDM's which took advantage of V86 mode, software applications which ran under DOS had to be run in real mode where the application could only access one Megabyte of memory. In order to combat these memory constraints, software designers built high powered DOS applications which were designed to take advantage of the full addressing capabilities of the 80386 processor. These applications included built-in DOS extenders which included a small protected mode kernel that took the 80386 into protected mode. When the software application was loaded, it created its own kernel, switched the 80386 into protected mode, and took over the machine completely. Since these high-powered DOS applications originally ran in real mode when they are loaded, they were running at ring 0 level and thus had complete access to all of the system resources required to flip themselves into protected mode.

However, with the introduction of virtual DOS monitors, problems resulted in the operation of DOS extenders. When a system included a VDM, DOS extenders were no longer allowed access to the system resources they required. A virtual DOS monitor is essentially a protected mode kernel wherein everything, including DOS, the ROM, and various applications are seen as V86 tasks which are running under the V86 monitor. The V86 monitor operates real mode tasks in V86 mode at ring 3 level, which is the least protected level. Therefore, in a computer system which includes a virtual DOS monitor, all DOS applications, including those with DOS extenders, are running in a V86 environment at ring 3 level. Therefore, a DOS extender operating as a V86 task no longer had the privilege to access the various system resources and system registers required to flip itself into protected mode. Thus DOS extenders were originally incompatible with any kernel which operated DOS application as V86 tasks. In order to allow the various DOS extenders to operate in conjunction with protected mode operating system software, the virtual control program interface (VCPI) was introduced. VCPI is a software interface designed to allow DOS extenders to operate in conjunction with protected mode kernels or VDM's.

To summarize the problems intended to be solved by the present invention, when a VDM is running a V86 task in V86 mode of the 80386 processor and receives an interrupt or exception, the 80386 enters ring 0 protected mode to service the condition. If the event is a software interrupt which requires a protected mode service, then the interrupt preferably includes its own entry point in the IDT, and the respective interrupt handler invokes the appropriate protected mode service. Problems arose where the protected mode kernel was not interruptible during the time that a protected mode service was being executed because no interrupts could be acknowledged during this time. As a result, the interrupt latency became intolerable, especially if an interrupt occurred in the beginning of the protected mode service. In instances where high speed communication devices are generating interrupts, several interrupts could come in during the protected mode service, and the data associated with their interrupts could be lost. Therefore, a method is needed to allow a protected mode kernel to service, in V86 mode, interrupts which occur during execution of ring 0 protected mode code.

SUMMARY OF THE INVENTION

The present invention comprises a method which enables a protected mode kernel or virtual DOS monitor to be reentrant or interruptible while a protected mode service is being performed. This reduces the interrupt latency during execution of protected mode services and thereby prevents errors from occurring in the system.

When a V86 task is operating and an exceptional condition such as an interrupt or exception is generated, the 80386 switches to ring 0 protected mode. If the exceptional condition is a software interrupt, then the software interrupt is funneled through the GP fault handler as described in the background. If the exceptional condition is not a software interrupt and generates an interrupt number such that the condition could be either a hardware interrupt or an exception, then the protected mode interrupt handler determines whether the external condition is a hardware interrupt or an exception by checking the ring 0 stack to see if an error code has been placed on the stack. If the condition is a hardware interrupt that requires a real mode ISR, then the interrupt handler reflects the interrupt to V86 mode where the ISR is executed, as was described above. If the condition is an exception, then the appropriate exception handler is invoked.

If the condition is a software interrupt which requires a protected mode service, the virtual DOS monitor enters the ring zero handler in protected mode and enables interrupts. As explained in the background, the transition from ring 3 virtual 8086 mode to ring 0 protected mode provides a V86 IRET frame (VMTF) on the ring 0 stack. The protected mode handler then pushes a pointer to the VMTF in a secondary stack referred to as the virtual mode frame stack (VMFS) according to the present invention. Interrupts are enabled through an STI instruction and the protected mode service routine is dispatched.

If an exceptional condition occurs during the protected mode service, the protected mode interrupt handler is entered, and the 80386 processor automatically saves the state of the protected mode service by placing the appropriate register values on the ring 0 stack. The saved state of the protected mode service is referred to as a protected mode trap frame (PMTF). In one embodiment of the invention, the interrupt handler determines whether an exceptional condition which occurs during a protected mode service is a hardware interrupt or exception. This determination may be done in several ways. In one embodiment, the determination of whether the condition is a hardware interrupt or an exception is done by maintaining a virtual copy of a register referred to as the in-service register in the programmable interrupt controller. In the preferred embodiment, it is assumed that no exceptions, except for page fault exceptions (exception number 14), should occur during execution of ring 0 protected mode code. Therefore each interrupt handler which corresponds to a hardware interrupt number other than 14 assumes that an exceptional condition which occurs during a protected mode service is a hardware interrupt. The interrupt 14 handler includes a method for distinguishing between hardware interrupts and exceptions.

If the exceptional condition is determined or assumed to be a hardware interrupt, the interrupt handler saves the contents of the data segment registers on the ring 0 stack. The top of the VMFS is used to get a pointer to the last VMTF on the ring 0 stack, which in this case is the only VMTF on the ring 0 stack, in order to create a new VMTF on top of the ring 0 stack. As described in the background, this is done to create the V86 environment that existed the last time the 80386 was in V86 mode. This enables the real mode ISR to enter V86 mode in the same state as when it previously left to service the condition that resulted in the transition to protected mode. The following sequence used to transfer from protected mode to V86 mode to execute the real mode ISR in V86 mode is similar to the interrupt reflection technique described in the background. The interrupt vector table is used to get the segment:offset of the entry point to the DOS or real mode interrupt service routine, and the new VMTF is modified with these variables. The ring 0 stack pointer in the task state segment is then updated to point where the new VMTF is. The ring 0 stack pointer in the TSS is updated so that, if another exceptional condition should occur during execution of the real mode ISR, and the 80386 switches from V86 mode back into protected mode, the new VMTF that would be saved on the ring zero stack would not be written over the original VMTF, the PMTF, and the protected mode data segment registers previously saved on the ring 0 stack. In addition, by updating the ring 0 stack pointer in the TSS each time that the protected mode interrupt handler reflects an interrupt back into V86 mode, if an exceptional condition should occur in the V86 ISR, the protected mode interrupt handler will be able to determine if this exceptional condition is a hardware interrupt or exception by checking to see if an error code is placed on the ring 0 stack. The V86 monitor then appends a pointer on the ring 3 stack so that the IRET from the V86 interrupt service routine enters a V86 routine which traps back to protected mode.

The V86 monitor then performs an IRET instruction to transfer to V86 mode where the interrupt service routine is executed. While the V86 interrupt service routine is being executed, interrupts may be re-enabled by code in the ISR. If an exceptional condition should occur during execution of the ISR, the 80386 would switch back into protected mode, a second VMTF would be placed on the ring 0 stack below the first VMTF and PMTF, and the condition would be handled as described above. If the interrupt number generated by the condition is such that both hardware interrupts and exceptions are mapped to this interrupt number, the protected mode interrupt handler determines if the condition is a hardware interrupt or exception by checking to see if an error code was placed on the ring 0 stack. The virtual mode frame stack is updated to point to the new VMTF each time a ring transition occurs from ring 3 to ring 0. In this manner, the VMFS keeps track of the last V86 environment in which the V86 monitor entered protected mode. This enables the V86 monitor to be nested down through multiple levels of interrupts.

When the V86 interrupt service routine completes, an IRET instruction is executed. The IRET instruction causes the 80386 processor to perform the V86 code that traps back into protected mode. The trap back to protected mode creates a VMTF on the ring 0 stack. The protected mode code that handles this trap discards this VMTF since the VMTF is an unwanted by-product created by the trap back to protected mode. The protected mode handler also updates the TSS ring 0 stack pointer to the value on top of the VMFS. The protected mode trap code then restores the data segment registers and performs an IRET to return to the protected mode service routine that was interrupted. The protected mode service routine continues processing with interrupts enabled and thus the occurrence of a hardware interrupt during the remainder of the protected mode service will duplicate the previous steps. After the protected mode service completes, the value on top of the VMFS is popped and an IRET returns the processor to the original virtual 8086 code.

In t his manner a virtual DOS monitor is reentrant or interruptible during execution of ring 0 protected mode code. The protected mode kernel can thus service, in V86 mode, hardware interrupts which occur during execution of ring 0 code. This reduces the interrupt latency during execution of ring 0 code, thus reducing the possibility of errors due to unacknowledged interrupts.

BRIEF DESCRIPTION OF THE DRAWINGS

A better understanding of the present invention can be obtained when the following detailed description of the preferred embodiment is considered in conjunction with the following drawings, in which:

FIGS. 9–11 are diagrams of ring 3 and ring 0 stacks used to reflect an interrupt from protected mode to an interrupt service routine in V86 mode;

FIGS. 13–26 are diagrams of the ring 0 stack during various stages of operation according to the preferred embodiment of the present invention.

DETAILED DESCRIPTION OF THE PREFERRED EMBODIMENT

The present invention comprises a software program that includes as one functional part a virtual DOS monitor. As explained in the background, a virtual DOS monitor is similar in functionality to the kernel of a simple operating system. In the preferred embodiment, the virtual DOS monitor manages hardware and software interrupts, I/O trapping, instruction emulation and general system error handling. The virtual DOS monitor of the present invention is preferably run on an IBM PC-compatible computer system which includes an 80386 processor. However, the use of later generation Intel 8086 family microprocessors such as the 80486 are also contemplated. The virtual DOS monitor may optionally be used to provide a multitasking environment for DOS applications. In the preferred embodiment of the present invention, the virtual DOS monitor is used in conjunction with an expanded memory manager to emulate expanded memory for DOS programs by using extended memory.

The virtual DOS monitor of the present invention is preferably an enhancement of the virtual DOS monitor described in U.S. Pat. No. 4,926,322 to Stimac, et al (the CEMM patent). As described in the background, the VDM described in the CEMM patent was not reentrant or interruptible during execution of ring 0 code. The virtual DOS monitor of the present invention is reentrant or interruptible, meaning that it can respond to interrupts during execution of ring 0 protected mode code.

Figure 1:
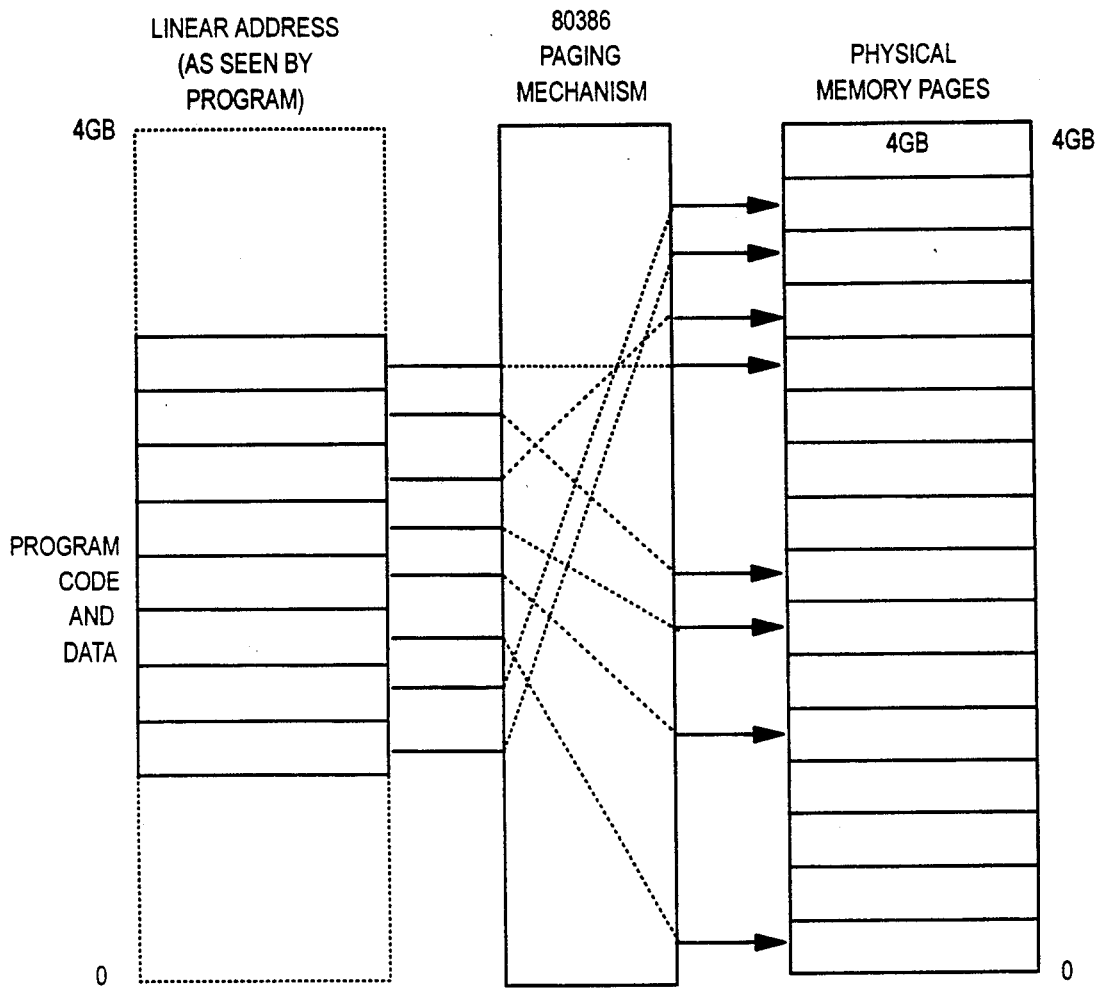
FIGS. 1 and 2 are diagrams of address translation in an 80386 processor used in one embodiment of the invention.
Figure 3:
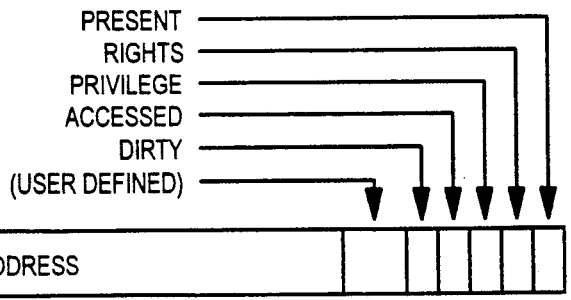
FIG. 3 is a diagram of the contents of a page table entry used in the address translation of FIG. 2.
Figure 2:
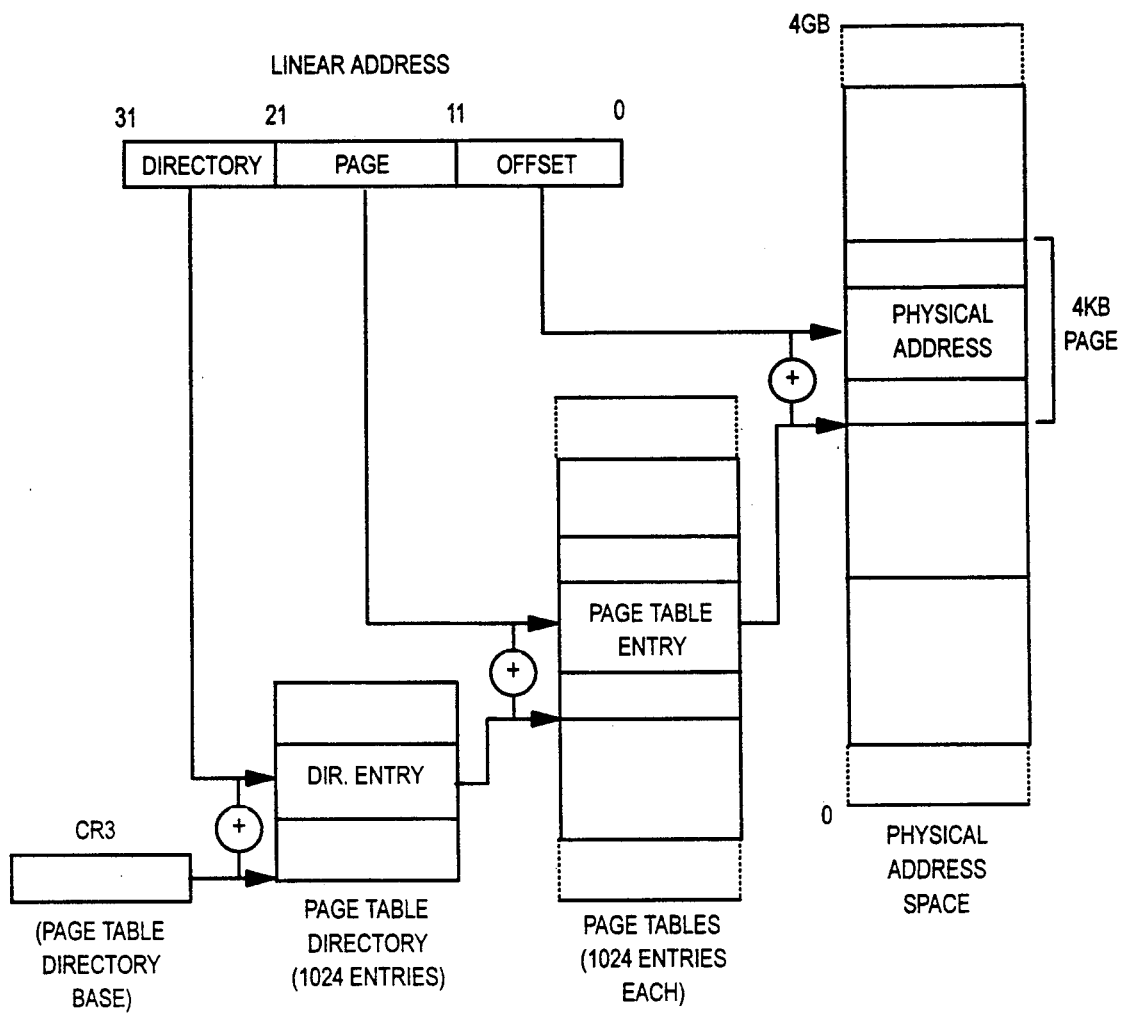
Figure 5:
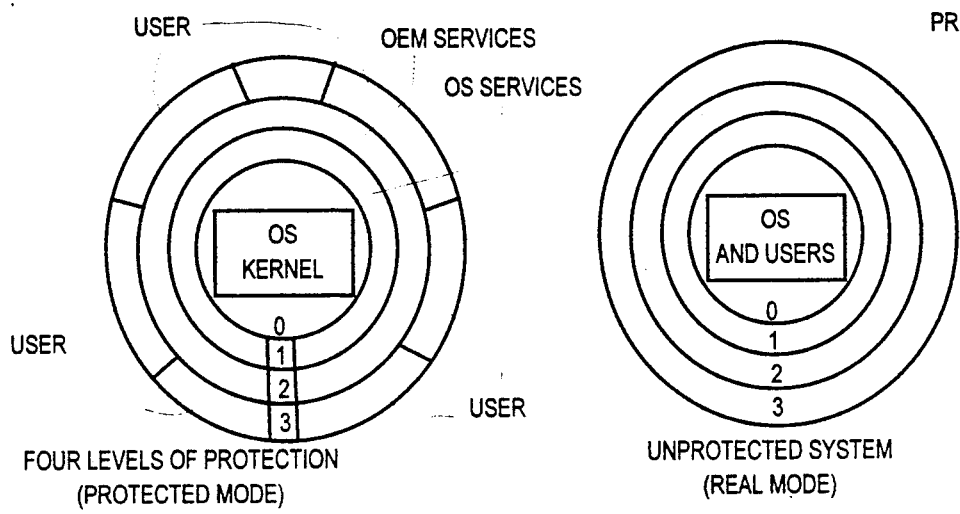
FIG. 5 is a diagram of privilege levels in an 80386 microprocessor used in one embodiment of the invention.
Figure 4:
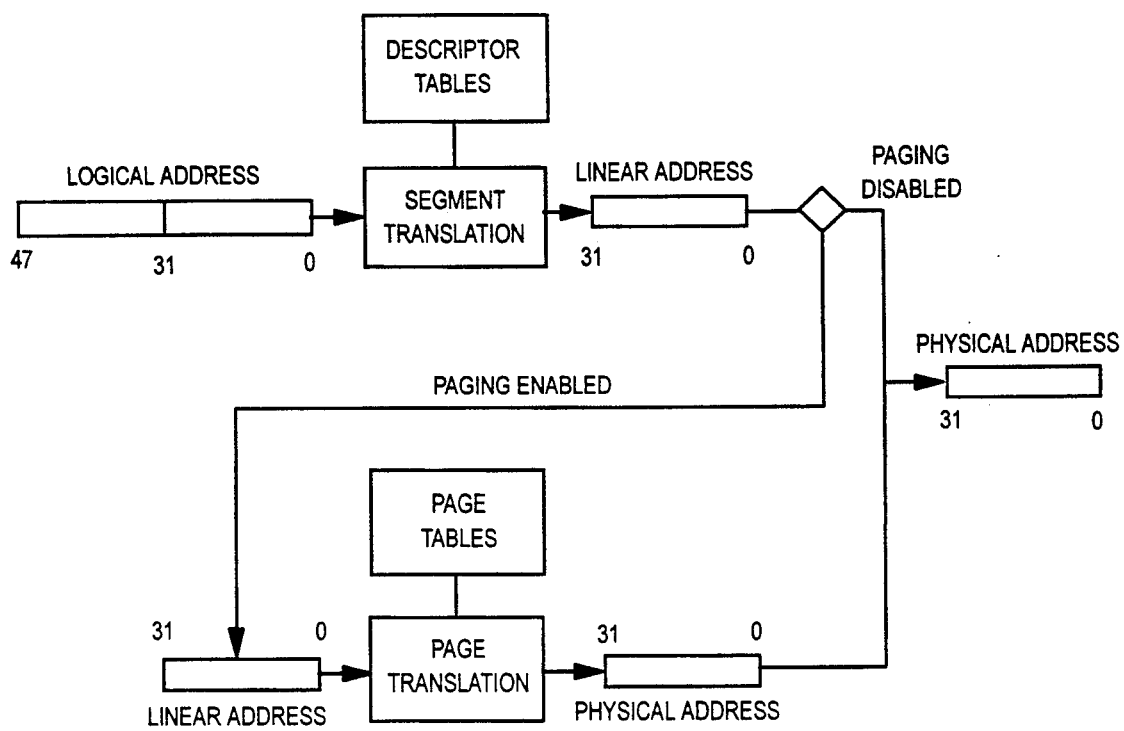
FIG. 4 is a diagram of logical-to-physical address translation in an 80386 microprocessor.
Figure 6:
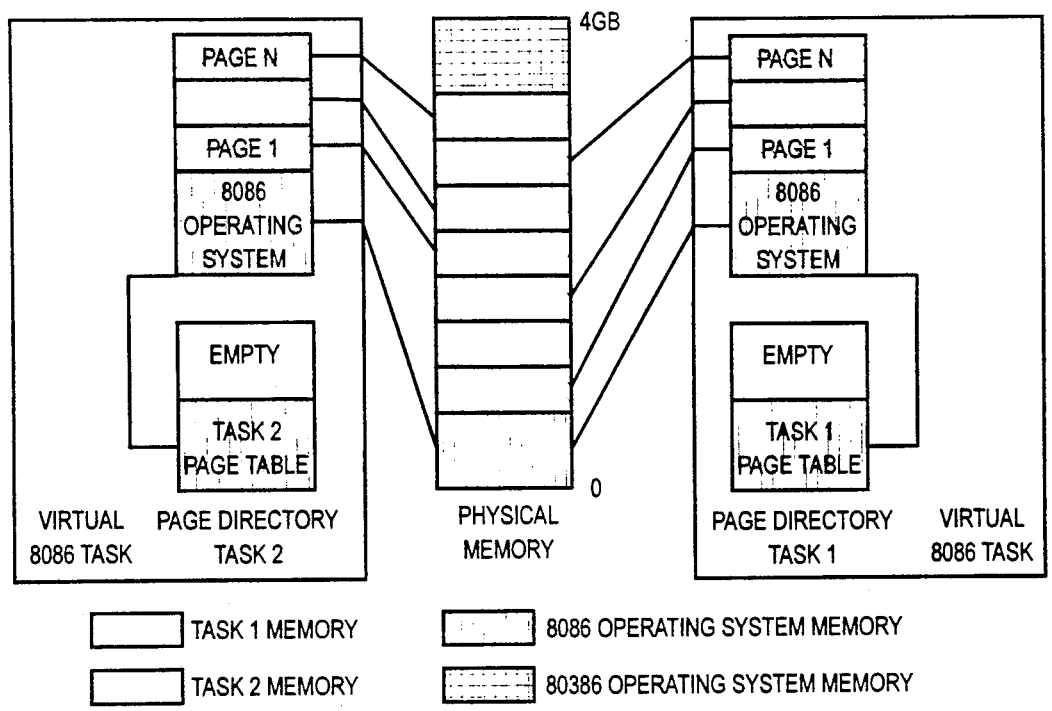
FIG. 6 is a diagram of the 80386 microprocessor paging mechanism as it is used to manage multiple virtual 8086 machine.
Figure 7:
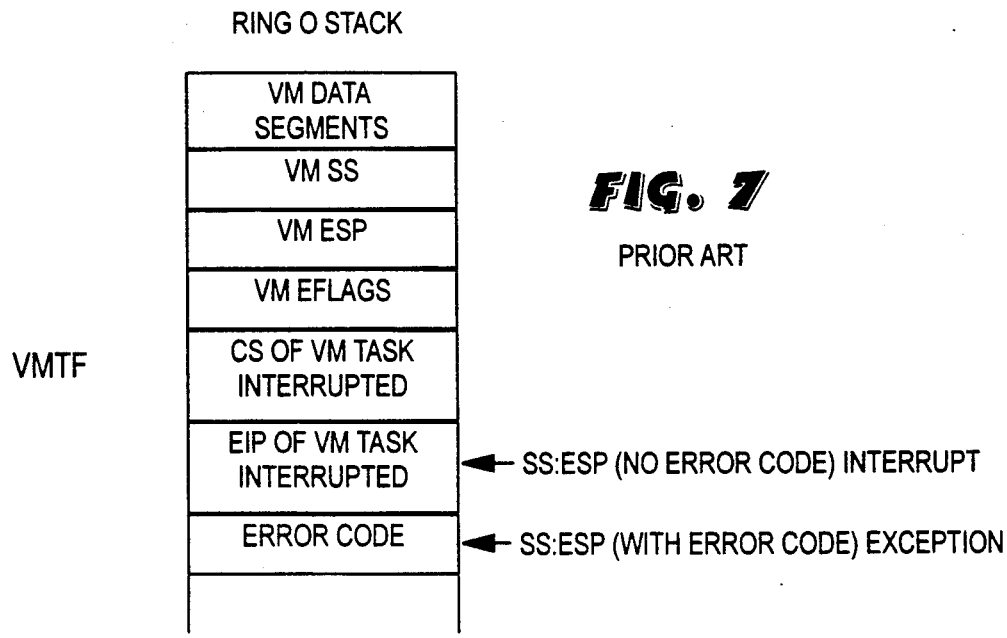
FIG. 7 is a diagram of the ring 0 stack in an 80386 processor used to determine whether an exceptional condition is an interrupt or an exception.
Figure 8:
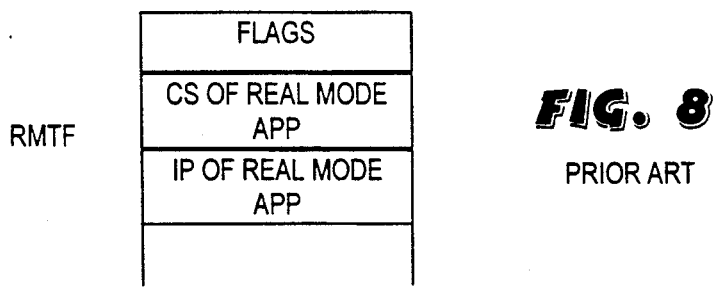
FIG. 8 is a diagram of a real mode stack used to save the state of an interrupted real mode program.
Figure 9:
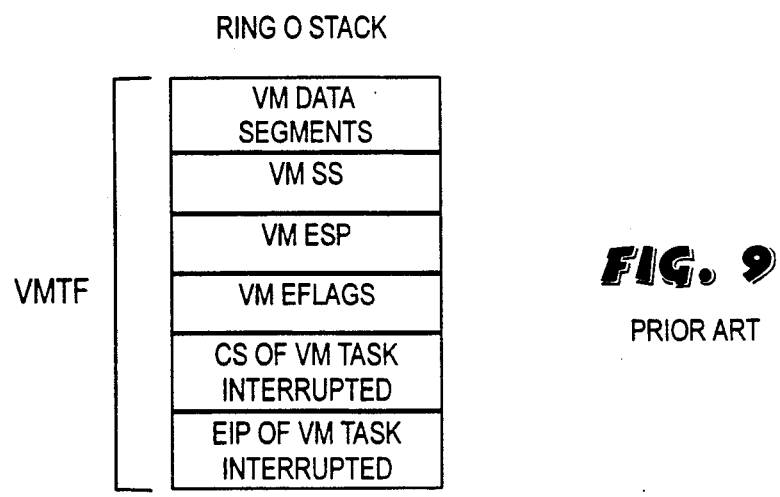
Figure 12A:
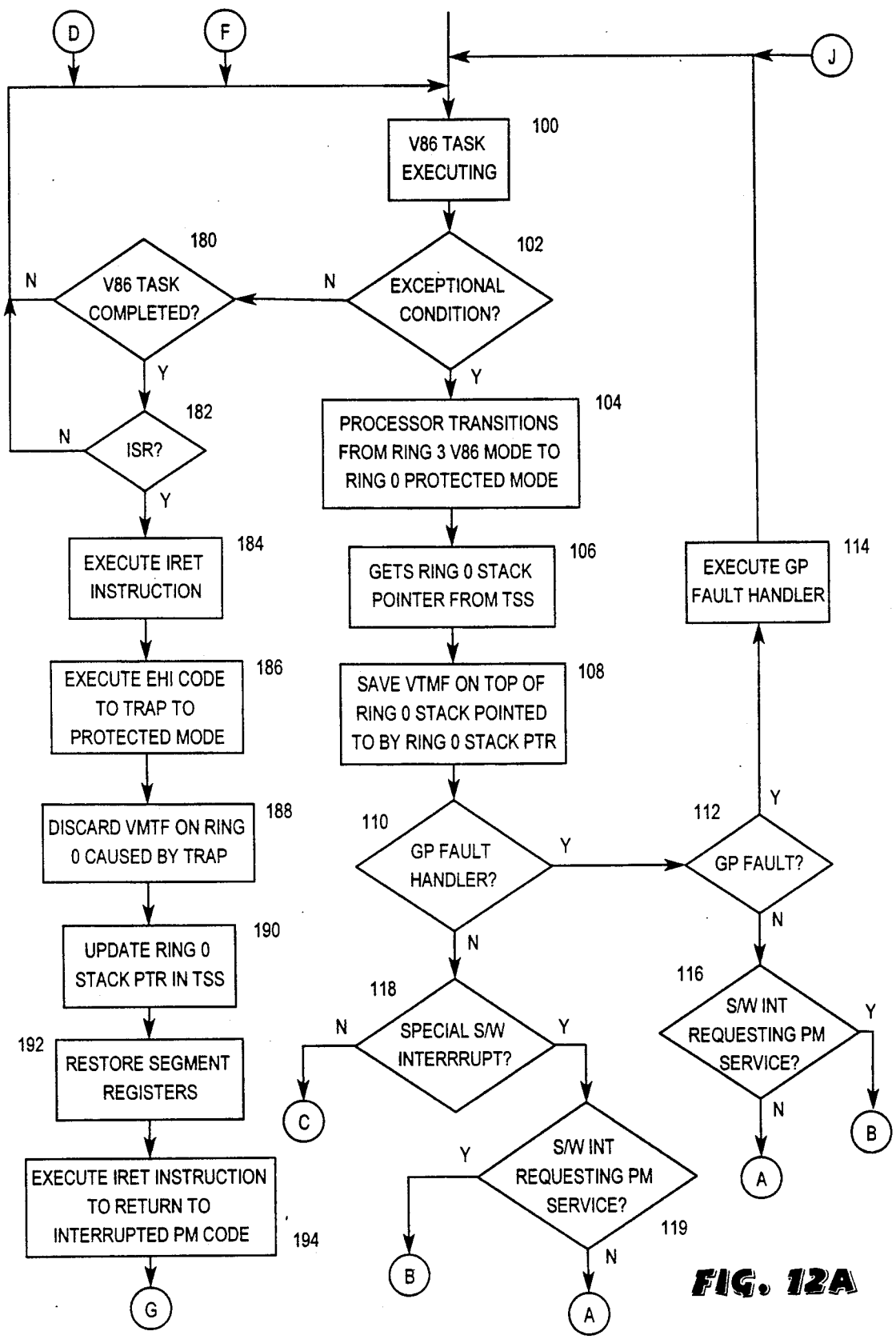
FIGS. 12A–C are flowchart diagrams illustrating operation of the present invention.
Figure 12B:
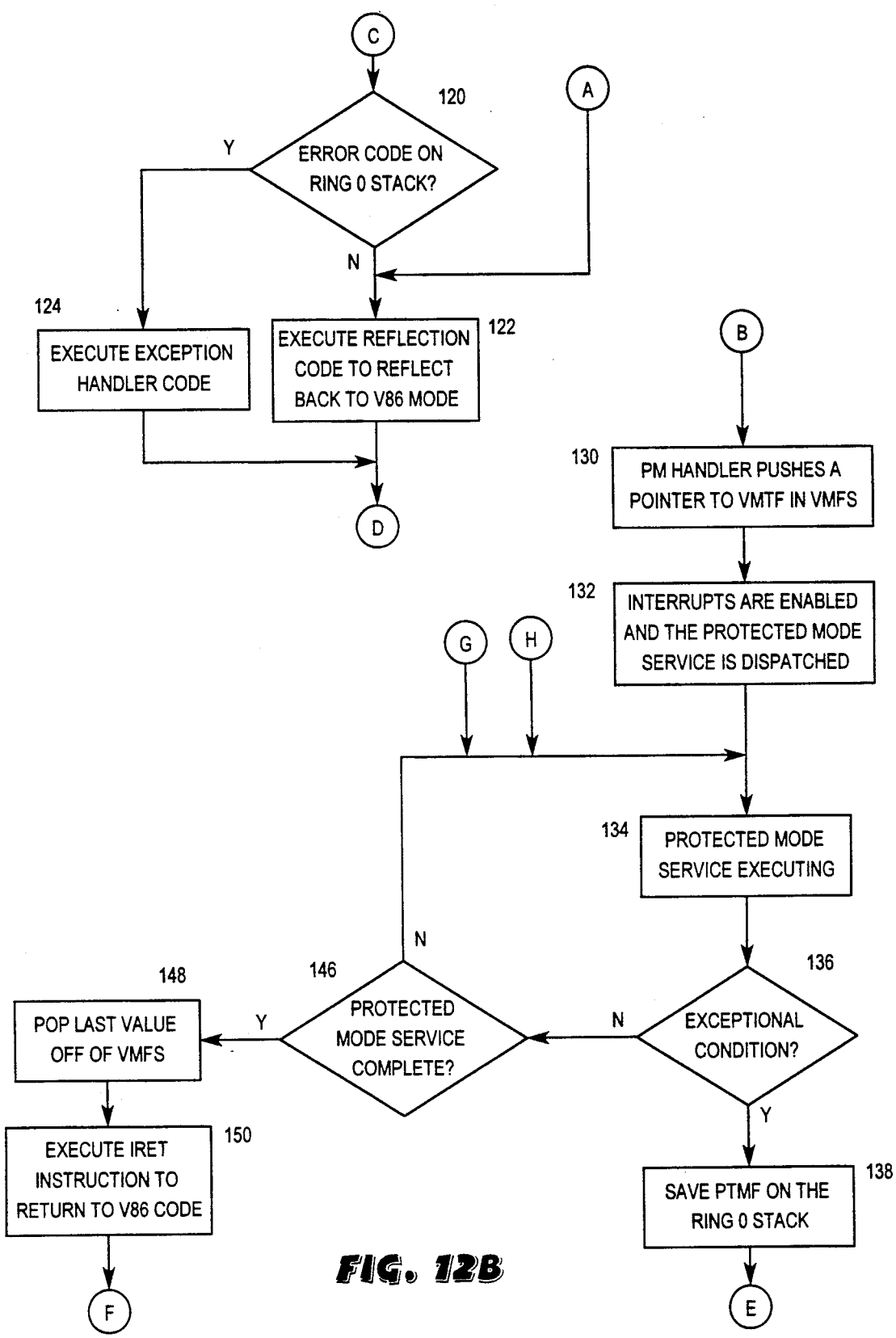
Figure 12C:
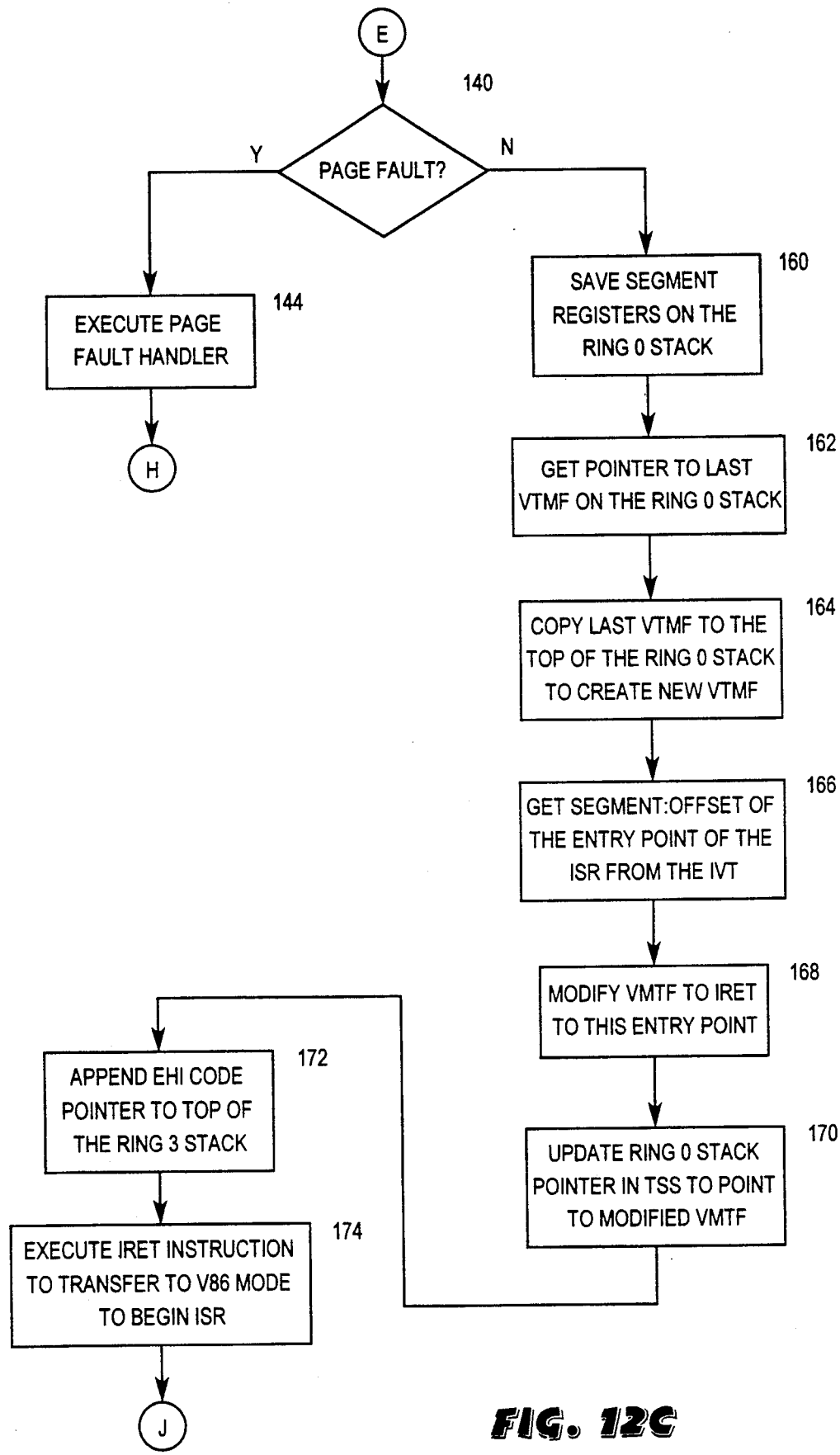

Referring now to FIGS. 12A–C, a flowchart diagram illustrating the operation of the present invention is disclosed. The flowchart is shown in four portions for clarity, with interconnections between the various portions made by reference to the circled letters A through J. To understand the operation of the VDM of the present invention, consider a V86 task running under the virtual DOS monitor in step 100. Interrupts are enabled during execution of the V86 task, as demonstrated by the loop between steps 100, 102, and 180 where the V86 task is executing in step 100 until either an exceptional condition occurs in step 102 or the V86 task completes in step 180. It is noted that here step 100 represents execution of a V86 task that may be subsequently interrupted. Step 100 is also used later in this description to represent execution of a real mode interrupt service routine that is executed as a V86 task. As described below, the interrupt service routine may be invoked from either a protected mode service or from within another V86 task.

If an exceptional condition occurs during execution of the V86 task in step 102, the 80386 processor performs a ring transition from ring 3 V86 mode to ring 0 protected mode in step 104. In protected mode, the protected mode handler gets the ring 0 stack pointer from the V86 task's task state segment (TSS) in step 106 to determine where to save the V86 IRET frame (VMTF). The VMTF is then saved on the ring 0 stack in step 108, as was described in the background. The ring 0 stack with the VMTF is shown in FIG. 13.

In the preferred embodiment, most software interrupts which occur during a V86 task are funneled into the general protection (GP) fault handler as described in the background. In IBM PC-compatible computer systems, each software interrupt has an associated interrupt number or vector which indexes to a respective descriptor in the Interrupt Descriptor Table (IDT). The respective descriptor generally includes a gate to where the appropriate interrupt service routine is located. The gate in the descriptor has a privilege level associated with it, and the 80386 compares the privilege level of the interrupted task with the privilege level of the respective gate to determine whether the interrupted task has the privilege to access the respective service routine. If the interrupted task has the required privilege, the 80386 vectors off to the appropriate ISR requested by the respective software interrupt.

In the preferred embodiment, the gates of the descriptors in the IDT that correspond to the software interrupts which are funneled into the GP fault handler are each designated privilege level 0 or ring 0. Therefore, when a software interrupt occurs during a V86 task, the V86 task, which operates at ring 3 level, lacks the necessary privilege to access the ring 0 code, and thus a GP fault occurs. In this manner, most software interrupts which occur during a V86 task are funneled into the GP fault handler. This obviates the necessity of having 256 different protected mode entry points and hence 256 different protected mode interrupt handler routines.

If the exceptional condition which occurred in step 102 is funneled into the GP fault handler in step 110, then code in the GP fault handler distinguishes between whether the condition was a software interrupt or an actual GP fault that occurred during the V86 task in step 112. This code examines the instruction prior to the occurrence of the exceptional condition in step 102 to determine whether the condition was a software interrupt or an actual GP fault. If the exceptional condition that occurred during the V86 task is determined to be a GP fault, then the GP fault handler is executed in step 114. When the GP fault handler completes, an IRET instruction returns the 80386 to execution of the original V86 task in step 100. If the exceptional condition is determined to be a software interrupt in step 112, then code in the GP fault handler determines whether the interrupt requests a real mode or protected mode service in step 116.

If the exceptional condition which occurred in step 102 did not invoke the GP fault handler in step 110, then the condition may be one of four software interrupts which each include their own protected mode interrupt handler according to the preferred embodiment. These four software interrupts are preferably INT 15h, INT 21h, INT 67h, and INT 4Bh. The descriptors in the IDT associated with these four interrupts each have a call gate that points to a respective protected mode interrupt handler. The respective call gates associated with these four interrupts have privilege level 3 to enable the respective interrupt handlers to be accessed from within a V86 task. These four interrupts include their own interrupt handler because they are entry points to protected mode services. If the exceptional condition that occurred in step 102 is one of these four software interrupts in step 118, then the appropriate protected mode interrupt handler is invoked. The respective interrupt handler is written such that, dependent on whether a real mode ISR or protected mode service is invoked, the interrupt handler invokes the appropriate code, as shown in step 119.

If the exceptional condition which occurred in step 102 is not funnelled into the GP fault handler in step 110 and is not one of the four software interrupts discussed above, then the interrupt number generated by the exceptional condition is such that the condition could be either a hardware interrupt or an exception. In this instance, the protected mode interrupt handler must determine whether the exceptional condition is a hardware interrupt or an exception. As described in the background, a problem arises due to the fact that both interrupts and exceptions are mapped to the same interrupt numbers in IBM PC-compatible computers. The method preferably used to distinguish between hardware interrupts and exceptions is that described in the background, wherein the ring 0 stack is checked for the presence of an error code in step 120 (FIG. 12B), which is indicative of an exception. If the exceptional condition is determined to be a hardware interrupt in step 120, then interrupt reflection code is executed in step 122 to reflect the interrupt to the appropriate real mode ISR in V86 mode, as was described in the background. As described in the background, the interrupt reflection code in step 122 saves the interrupted V86 state on the ring 3 stack so that the IRET instruction at the end of the ISR resumes execution of the original, interrupted V86 task in step 100. The real mode ISR is executed as a V86 task in step 100, and during this time an exceptional condition may occur in step 102 which would cause the above steps to be repeated.

If the exceptional condition is determined in step 120 to be an exception, then the respective protected mode exception handler is invoked in step 124. Upon completion of the exception handler in step 124, the 80386 returns to execution of the originally interrupted V86 task in step 100.

Referring again to FIG. 12A, if the software interrupt determined to have occurred in step 112 or 118 requests a real mode service in step 116 or 119 respectively, the interrupt reflection code is executed in step 122, and the real mode service is executed as a V86 task in step 100. Here again, the interrupted V86 state is saved on the ring 3 stack so that the IRET instruction at the end of the ISR resumes execution of the original, interrupted V86 task in step 100. If the respective software interrupt requires a protected mode service in step 116 or 119, then the following procedure is executed.

The above discussion includes some background on the manner in which the 80386 processor handles various exceptional conditions. The above discussion also includes some background on the manner in which the 80386 processor begins executing protected mode code according to one embodiment of the invention. It is noted that the manner in which the 80386 processor begins executing protected mode code is generally irrelevant according to the present invention. The present invention is operative once the 80386 processor begins executing protected mode code to allow the processor to be reentrant or interruptible during this time, as is described below.

Figure 14:
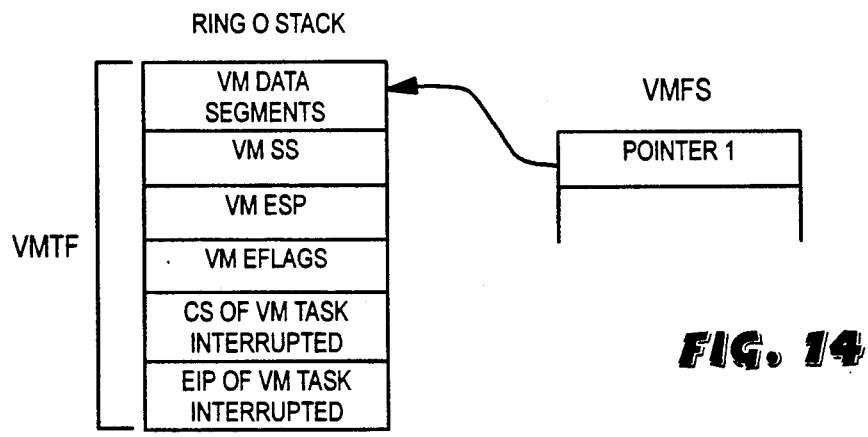
Figure 15:
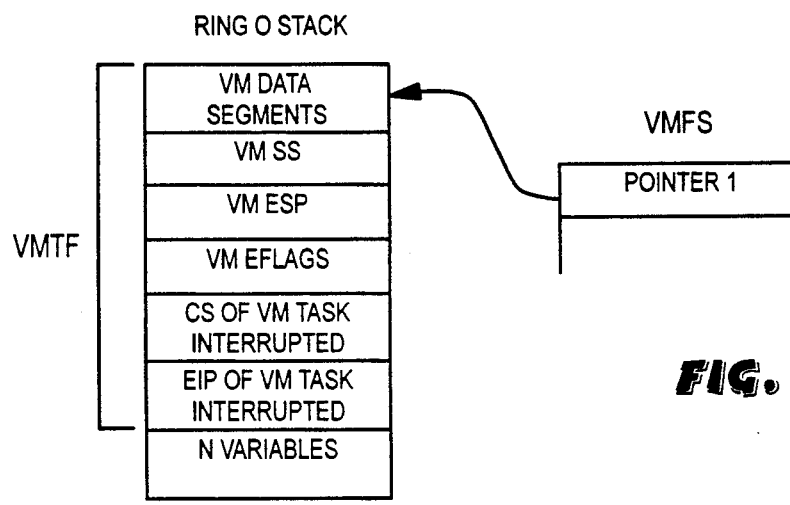

Referring now to FIGS. 14 and 12B, the protected mode interrupt handler first pushes a pointer to the VMTF in a second stack referred to as the virtual mode frame stack (VMFS) in step 130. The VMFS is used to keep track of the most recent VMTF saved on the ring 0 stack when interrupts are nested down multiple levels, as is explained below. The interrupt handler then enables interrupts by performing an STI instruction, and the protected mode service routine is dispatched in step 132. During execution in step 134, the protected mode service uses the ring 0 stack as a local storage area to store necessary variables. Therefore, as shown in FIG. 15, there may be a certain indeterminable number n of variables on the ring 0 stack at any given time during execution of the protected mode service.

Figure 16:
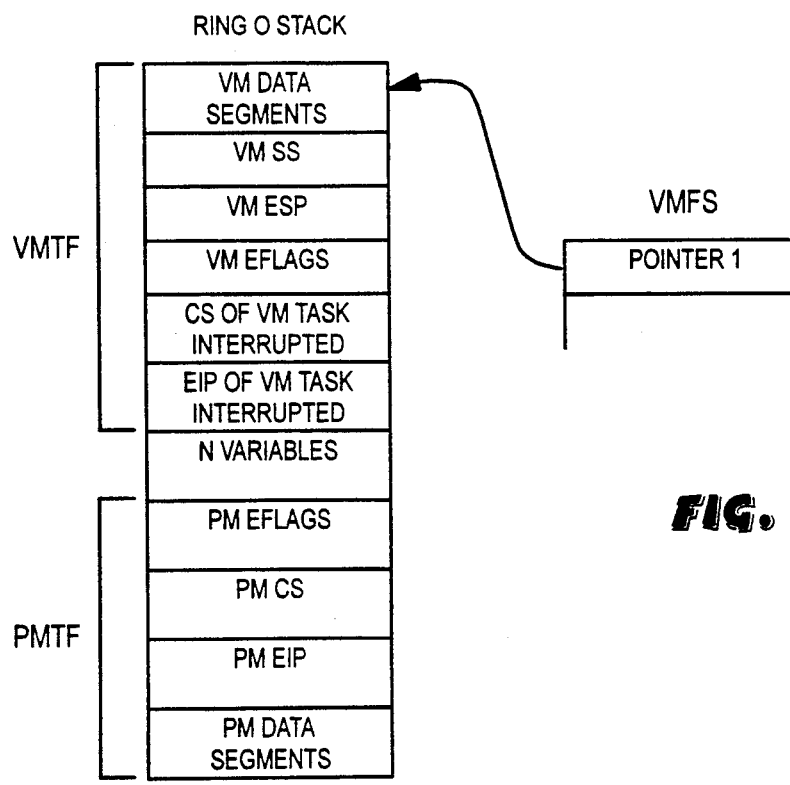

At some point during execution of the protected mode service in step 134, an exceptional condition may occur, as shown in step 136. This is demonstrated by the loop between steps 134, 136, and 146 where the protected mode service is executing in step 134 until either an exceptional condition occurs in step 136 or the protected mode service completes in step 146. Referring now to FIG. 16, if an exceptional condition should occur in step 136 during execution of the protected mode service in step 134, the 80386 saves the current value of EFLAGS, CS, and EIP onto the ring 0 stack in step 138. These three values are referred to as the protected mode trap frame or PMTF.

In the preferred embodiment, software interrupts or INT instructions are not included in protected mode services. As previously discussed, most software interrupts which occur during a V86 task are designed to generate a GP fault since the V86 task operating at ring 3 level lacks the privilege to access ring 0 code. However, a software interrupt occurring during a protected mode service executing at ring 0 level would have the privilege to access the ring 0 level interrupt handler through the gate in the IDT. However, these gates were designed merely to generate GP faults, and no protected mode interrupt handlers are actually written for software interrupts except for the four noted above. Therefore, a software interrupt that occurred during a protected mode service, would result in probable erroneous operation. Therefore, software interrupts are not included in protected mode services in the preferred embodiment. However, in an alternate embodiment, each software interrupt could include its own protected mode interrupt handler at ring 0, and therefore all software interrupts could be utilized in protected mode services with GP faults optionally still occurring if access to these interrupt handlers was attempted by a software interrupt occurring within a V86 task.

Therefore, when an exceptional condition occurs during a protected mode service in step 136, the protected mode interrupt handler must determine if the condition is a hardware interrupt or an exception. The method described in U.S. Pat. No. 4,926,322 and discussed above whereby the ring 0 stack pointer SP is examined to determine if there is an error code on the ring 0 stack will not work for exceptional conditions which occur during execution of protected mode code.

It is impossible to distinguish between hardware interrupts or exceptions using the method described in the background because an indeterminable number n of variables will generally be on the ring 0 stack when the exceptional condition occurs, and therefore it is impossible to measure the depth of the stack to determine if an error code was placed on the ring 0 stack. For this reason, the method described in the background and in the CEMM patent does not work for exceptional conditions which occur during execution of protected mode code.

One method that could be used to determine whether an exceptional condition is a hardware interrupt or an exception is to reprogram the programmable interrupt controller (PIC) so that hardware interrupts would occur outside of the area reserved for exceptions, thereby removing conflicts between the two. By reprogramming the PIC, any time a hardware interrupt and one of the IRQ0-7 lines is asserted, the PIC would generate an interrupt value outside of the area reserved for exceptions. For example, currently in IBM PC-compatible computers the PIC is programmed to generate interrupts 8-15 when the IRQ0-7 lines are asserted, respectively. However, the PIC could be reprogrammed to generate other interrupt numbers, for example, interrupt numbers 50-57, whenever the IRQ0-7 lines are asserted, respectively.

In order to maintain compatibility with DOS applications, the protected mode interrupt handlers in the VDM could be written such that these new interrupts would be reflected back to the original DOS ISR's where they were originally programmed to occur, which would be interrupts 8-15. Therefore, even though the PIC would generate interrupt numbers 50-57 in response to a hardware interrupt, the interrupt handler could reflect these interrupts back to interrupts 8-15 to allow the correct interrupt service routines to be invoked. In this manner, the protected mode kernel would be able to differentiate between hardware interrupts and exceptions and would simply reflect the interrupts back to the appropriate interrupt number so that the proper ISR's could be invoked.

However, due to problems with the virtual control program interface (VCPI), and certain application programs use of this interface, it is generally impossible to reprogram the PIC without causing incompatibility with various software applications. As explained in the background, VCPI is a software interface which allows DOS extenders to operate in conjunction with a protected mode kernel that operates above DOS in protected mode. DOS applications which include DOS extenders would not be affected by a reprogramming of the PIC because the associated DOS extenders take the 80386 into protected mode and therefore are able to reflect interrupts back to their original real mode DOS locations. However, a popular software application uses the VCPI interface but does not take the 80386 into protected mode, instead operating in real mode. This application does not attempt to create its own protected mode kernel, but rather sets up a real mode environment. However, the application uses the VCPI interface to determine where interrupts are programmed by the PIC so that it can assume control of the system. The application determines the interrupt numbers where hardware interrupts are currently programmed and then reappoints these hardware interrupts to its own hardware interrupt handler. The application being discussed which uses the VCPI interface but does not take the 80386 into protected mode is an environment and therefore needs to be aware of hardware interrupts as they occur because it might be running multiple DOS tasks and therefore need to manage interrupts and distribute them accordingly.

Because this application is using the VCPI interface, the virtual DOS monitor assumes that the application is a DOS extender that takes the 80386 into protected mode, and the VDM would inform the application that IRQ lines 0-7 are programmed to interrupts 50-57. Since the application is a real mode application, interrupts which occur are handled by the protected mode interrupt handler in the VDM. The protected mode interrupt handler reflects these interrupts back to the appropriate real mode interrupt numbers so that the appropriate interrupt service routines can be executed. However, since the application was informed that the interrupt would actually be coming in at 50, the application expects to see the interrupt at 50. The application will have reappointed interrupt 50 so that the application's own interrupt handler will service this interrupt. However, the interrupt will actually come in at 8 because of the interrupt reflection performed by the interrupt handler in the VDM, and the application will miss the interrupt. Therefore, incompatibility results when one attempts to reprogram the PIC due to certain problems associated with the VCPI interface and certain applications' use of this interface.

Another method that could be used to differentiate between hardware interrupts and exceptions is to read the in-service register in the programmable interrupt controller (PIC). The PIC includes eight interrupt request lines referred to as IRQ0-IRQ7, and each of these lines correspond to a hardware or I/O device capable of interrupting the computer system to request service. The PIC also includes an in-service register, which is an eight bit register used to keep track of which interrupt and hence which device is currently being serviced. The in-service register has a respective bit set for the respective interrupt line or device currently being serviced. Therefore, in this method, when an interrupt occurs, the protected mode interrupt handler reads the in-service register to determine if an interrupt has occurred. If no bit has been set in the in-service register, then no hardware interrupt has been serviced, and therefore the protected mode interrupt handler determines that the exceptional condition was an exception.

However, there is a problem with this scheme because of the fact that a bit being set in the in-service register does not guarantee that the current exceptional condition is a hardware interrupt. The reason for this is that a bit in the in-service register gets set at the beginning of a hardware interrupt and only gets cleared when an end of interrupt (EOI) occurs at the end of the interrupt service routine. At the end of every hardware interrupt service routine the 80386 goes out to the PIC during an EOI instruction to clear the respective interrupt bit in the in-service register. Therefore, if an exception should occur and be acknowledged during the processing of an interrupt, which is possible with a reentrant or interruptible protected mode kernel according to the present invention, then the respective bit in the in-service routine would still be set when the exception occurs. Because interrupts can be nested down multiple levels, it is possible that an exception could occur and be acknowledged during the servicing of an interrupt, and therefore the respective bit in the in-service register would remain set, falsely indicating that the current condition was an interrupt when really it was an exception.

A method to differentiate between hardware interrupts and exceptions according to one embodiment of the invention is to maintain a virtual copy of the in-service register. A virtualization of the in-service register entails keeping track of the state of the in-service register to detect when respective bits get set. The protected mode interrupt handler monitors the status of the various bits in the in-service register and traps every EOI that is sent out to the PIC. By keeping track of the respective bits set in the in-service register and monitoring all EOI's, which signify the end of these interrupts, the protected mode interrupt handler is able to determine if the respective exceptional condition is an interrupt or an exception. The interrupt handler knows that, if the bit in the in-service register corresponding to the current exceptional conditions is not set and it has not trapped an EOI yet, then the current exceptional condition is an exception. If the respective bit is set in the in-service register as a result of the exceptional condition, then the exceptional condition is a hardware interrupt. One problem with this method is that performance is reduced. A virtualization of the in-service register entails trapping all accesses to the in-service register and also trapping all EOI's. This causes degradation in system performance due to the overhead required.

In the preferred embodiment of the present invention, no determination is made between hardware interrupts and exceptions during execution of ring 0 protected mode code because it is assumed that no exceptions, except for page faults, should occur during execution of a protected mode service. Most exceptions are generated by the 80386 microcode to indicate that some type of error has occurred during execution of code. Since protected mode services are written by the developer of the operating system kernel in the preferred embodiment, it is assumed that no exceptions should occur during a protected mode service, except for page faults. Page faults occur when a program generates a linear address that is not currently mapped to any physical address. Page faults can occur in any system that implements virtual memory, and therefore this type of exception can occur during a protected mode service. If an exception other than a page fault should occur during a protected mode service, the exception would presumably be so catastrophic as to warrant a shutdown of the system.

Therefore, the method used according to the preferred embodiment of the present invention is to generally assume that any exceptional condition which occurs during a protected mode service is a hardware interrupt. The lone exception to this is the interrupt 14 handler, which includes code that determines whether the exceptional condition is a page fault exception or a hardware interrupt.

Referring now to FIG. 12C, the method according to the preferred embodiment determines in step 140 if a page fault exception has occurred. This is done by having the interrupt 14 handler determine if the condition is a page fault exception or a hardware interrupt. This determination is made by checking the contents of a register referred to as the CR2 register. The 80386 processor stores the linear address that causes a page fault exception into the CR2 register when reporting a page exception. The page fault handler examines the contents of the CR2 register to determine which page in the linear address space caused the exception. Therefore, the interrupt 14 handler according to the present invention makes a preliminary check of the contents of the CR2 register to determine if the current exceptional condition is a page fault exception or a hardware interrupt. If the CR2 register is not zero, then a page fault has occurred, and the page fault exception handler executes in step 144. One of the functions of the page fault exception handler is to zero the CR2 register so that in subsequent operations the interrupt 14 handler can perform the above-mentioned determination. Upon completion of the exception handler in step 144, the 80386 returns to execution of the protected mode service in step 134. If a page fault did not occur, namely any exceptional condition other than interrupt 14 occurred or the interrupt 14 handler determined that a page fault had not occurred, the method according to the preferred embodiment proceeds to interrupt reflector code according to the present invention, beginning with step 160, which reflects the interrupt back to the appropriate ISR. Therefore, an exceptional condition that occurs during a protected mode service that invokes any interrupt handler other than the interrupt 14 handler is assumed to be a hardware interrupt.

Referring again to FIG. 12B, if no exceptional condition occurs during execution of the protected mode service in step 134, then the protected mode service completes in step 146. The value stored in the VMFS in FIG. 15 is popped in step 148 and the processor executes an IRET instruction to return to the interrupted V86 code in step 150. The value stored in the VMFS is popped to enable the processor to pop the VMTF off of the ring 0 stack to return to the original, interrupted V86 task in step 100. Since the only exceptional condition that has occurred is the software interrupt which requested the protected mode service in step 102, the ring 0 stack is not nested down multiple levels. The processor returns to execution of the most recently interrupted V86 task, which in this instance is the original V86 task in step 100. In this instance, the features of the present invention which enable the 80386 processor to be reentrant or interruptible during execution of ring 0 protected mode code were not utilized since no hardware interrupt occurred during the protected mode service.

Figure 17:
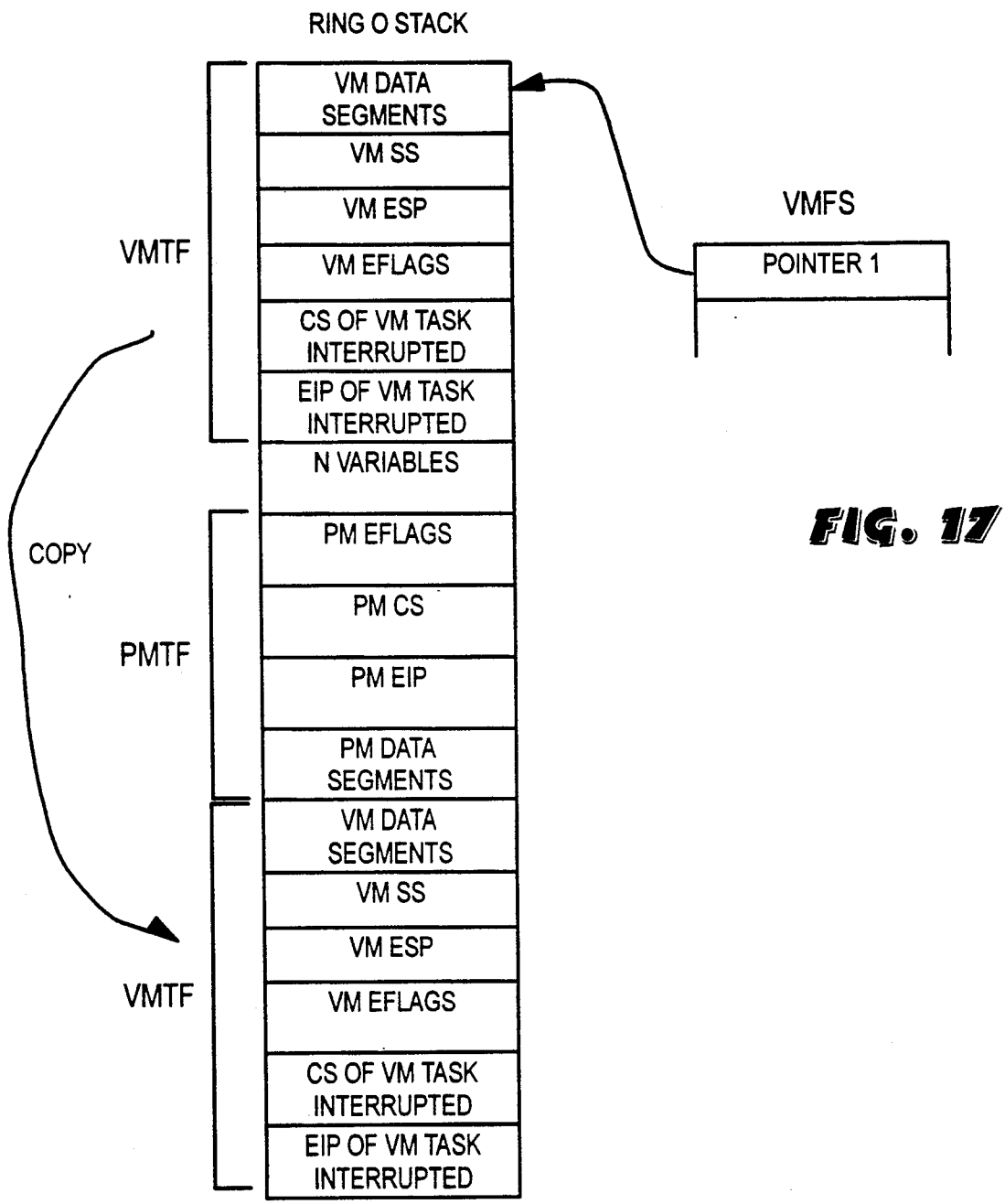

Referring again to FIG. 12C, if the exceptional condition which occurred in step 136 is determined or assumed to be a hardware interrupt in steps 142 or 140, respectively, then the interrupt handler saves the current values of all of the data segments being used in the protected mode service onto the ring 0 stack in step 160. The protected mode interrupt handler goes to the top of the VMFS to get a pointer to the last VMTF on the ring 0 stack in step 162, which in this case is the only VMTF on the ring 0 stack. However, if multiple interrupts had already occurred before completion of the first interrupt, and multiple VMTF's were nested on the ring 0 stack, the last value placed on the VMFS would point to the last or most recent VMTF on the ring 0 stack. The last VMTF is copied down to the top of the ring 0 stack in step 164 to create a new VMTF on top of the ring 0 stack as shown in FIG. 17. The last VMTF is copied to the top of the ring 0 stack to duplicate the last state of the V86 environment when the last ring transition from ring 3 to ring 0 occurred.

Figure 18:
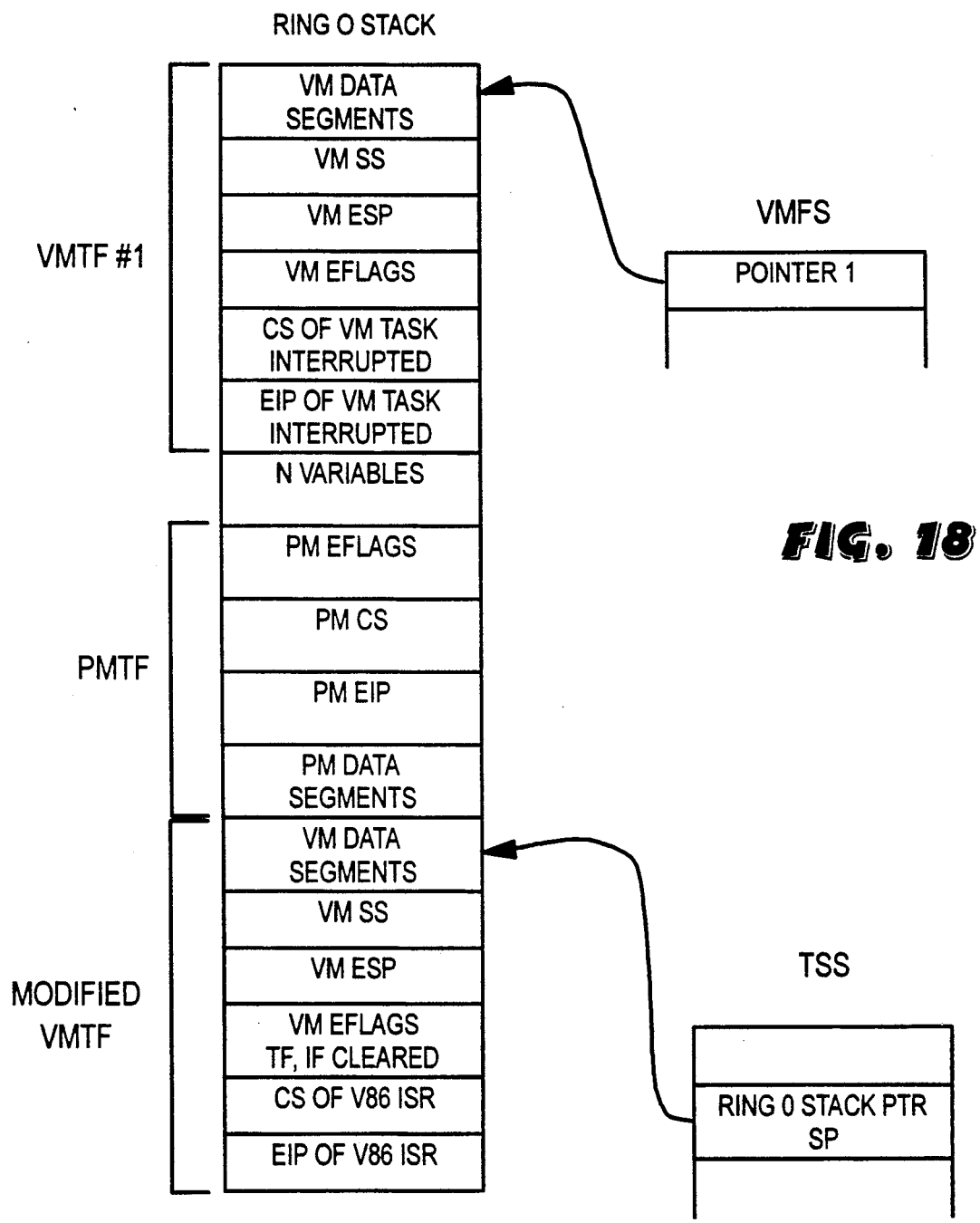

Referring now to FIG. 18, the protected mode interrupt handler now does something similar to the interrupt reflection technique described in the background. The protected mode interrupt handler determines the correct entry point for the real mode ISR from the interrupt vector table (IVT) in step 166 and places this value in the CS and the EIP of the newly created VMTF in step 168. The interrupt handler also modifies the EFLAGS value on the ring 0 stack, clearing the TF and IF bits in step 168. This emulates what the 80386 would have done had the interrupt occurred in real mode. In this manner, the interrupt service routine required to service the hardware interrupt will be executed in the same V86 state, meaning the same values for the data segments, SS, ESP, and EFLAGS, that existed the last time the processor was in V86 mode. In copying the original VMTF to the top of the ring 0 stack and then modifying the CS:EIP of this new VMTF to point to the real mode ISR, this procedure essentially emulates the V86 environment which would have existed had this hardware interrupt actually occurred in V86 mode instead of during execution of the protected mode service.

The ring 0 stack pointer in the task state segment is then updated in step 170 to point to where this newly created VMTF begins on the ring 0 stack, as shown in FIG. 18. The ring 0 stack pointer is updated so that if a subsequent interrupt occurred during the real mode ISR, and a ring transition occurred from ring 3 V86 mode to ring 0 protected mode, the new VMTF that would be placed on the ring 0 stack would not overwrite the original VMTF, referred to as VMTF#1 in FIG. 18, saved on the ring 0 stack. In this manner, the ring 0 stack pointer SS:ESP is updated to allow the multiple nesting of interrupts. The ring 0 stack pointer now appears as shown in FIG. 18.

The protected mode interrupt handler then appends a value on the V86 ring 3 stack (not shown) in step 172 so that the IRET from the real mode ISR Will cause the 80386 to enter a V86 routine which traps back into protected mode. This V86 routine is referred to as an end of hardware interrupt or EHI routine. The EHI routine used in the preferred embodiment includes a software interrupt which traps back into protected mode. Since software routines which trap from V86 mode to protected mode are well known to those skilled in the art, details of its operation are omitted for simplicity. The protected mode interrupt handler then executes an IRET instruction in step 174 to enter V86 mode and begin executing the real mode interrupt service routine as a V86 task, as shown in step 100. The IRET pops the modified VMTF off of the ring 0 stack, performs a ring transition from ring 0 to ring 3 V86 mode, and uses these values to set up a V86 environment for execution of the real mode ISR. The CS and EIP of the modified VMTF point to the real mode ISR, which is where the 80386 processor begins executing in step 100. Recall that the interrupt flag IF had been cleared in the EFLAGS value and, therefore, interrupts are disabled when the 80386 begins execution of the real mode ISR. However, the real mode ISR may include code which reenables interrupts, and it is possible that exceptional conditions could occur during execution of the real mode ISR. The VDM is capable of handling exceptional conditions even though the ring 0 stack is already nested down one level of interrupt.

Figure 19:
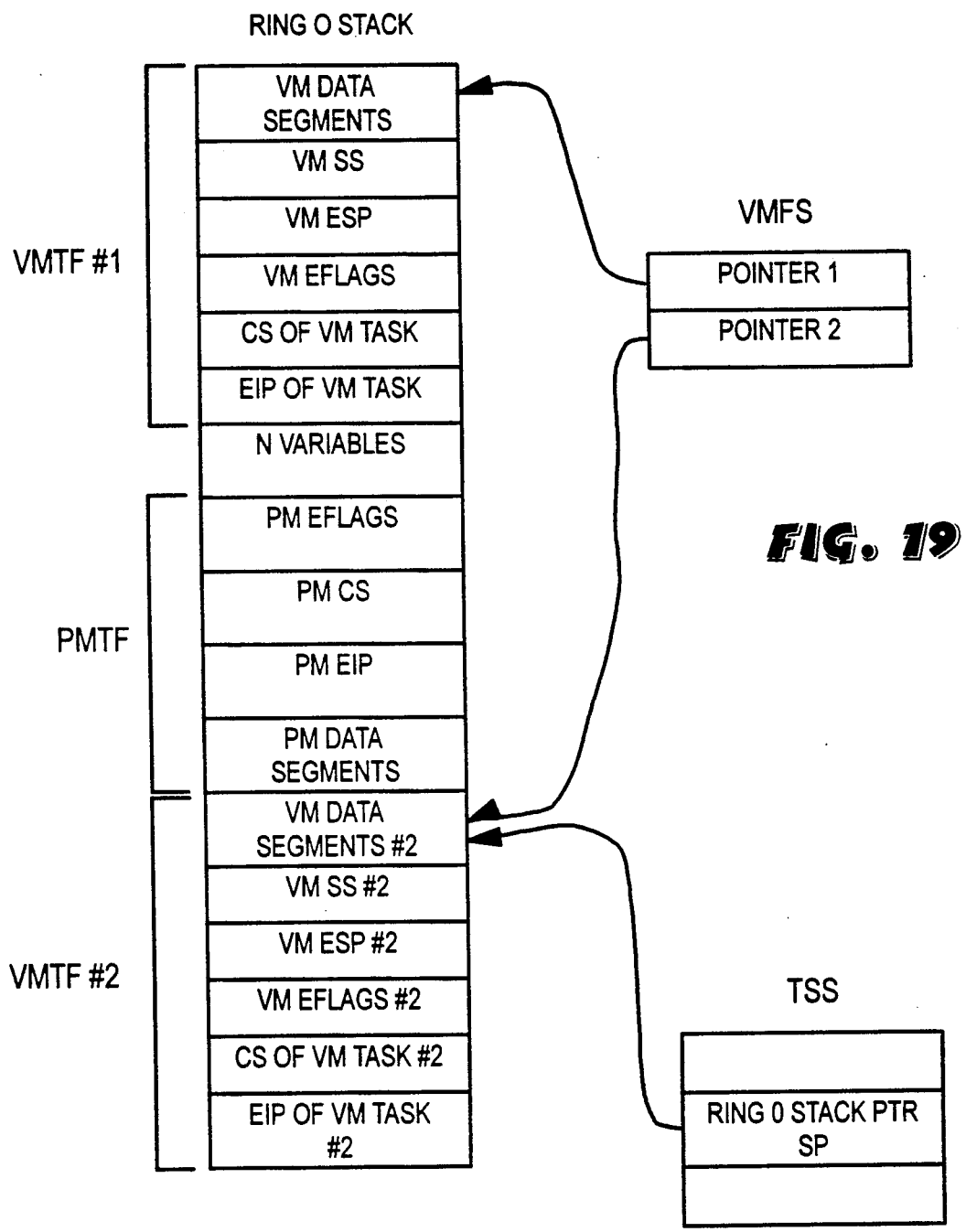

If an exceptional condition should occur in step 102 while the 80386 is executing the ISR as a V86 task in step 100, then the condition is handled in an identical manner as the exceptional condition that occurred in the original V86 task. For the purposes of this disclosure, it is assumed that an exceptional condition occurs in step 102. In response to the 108. A ring transition occurs from ring 3 V86 mode to ring 0 protected mode in step 104. In step 106, the microcode which performs the ring transition operations incorporated in the 80386 itself gets the ring 0 stack pointer from the TSS to determine where to place the new VMTF on the ring 0 stack. Referring now to FIG. 19, the new VMTF, referred to as VMTF#2, which contains the current state of the V86 environment during execution of the ISR when this second exceptional condition occurred, is saved on the ring 0 stack in step 108 at the place pointed to by the ring 0 stack pointer. This is the reason that the ring 0 stack pointer SS:ESP was updated to point to the modified VMTF in step 134. If the ring 0 stack pointer SS:ESP had not been updated, then VMTF#2 would have been placed on the ring 0 stack overwriting the original VMTF#1, thereby causing the original V86 environment to be lost. As shown in FIG. 19, VMTF#2 is placed on the ring 0 stack where the modified VMTF (FIG. 18) was previously located.

If the exceptional condition which occurred in step 102 is a software interrupt, the software interrupt is handled appropriately depending on whether the interrupt requests a real mode ISR or a protected mode service in step 116. If the exceptional condition is not a software interrupt or a GP fault, then the protected mode interrupt handler determines whether the condition is a hardware interrupt or exception by checking the error code on the ring 0 stack in step 120. This can be determined by checking the depth of the ring 0 stack from the beginning of VMTF#2, which is determined by the ring 0 stack pointer. If the condition that occurred was a hardware interrupt, the protected mode interrupt handler would reflect this interrupt back to V86 mode where the real mode ISR would be executed as a V86 task in step 100, as was explained above and in the background. In this instance, the interrupted V86 state would be saved on the ring 3 stack by the interrupt reflection code in step 122 so that the IRET instruction at the end of the ISR would resume execution of the interrupted V86 task. If the condition was an exception, then preferably the respective protected mode exception handler would be invoked to handle the exception, upon completion of which the V86 task would resume in step 100.

Figure 20:
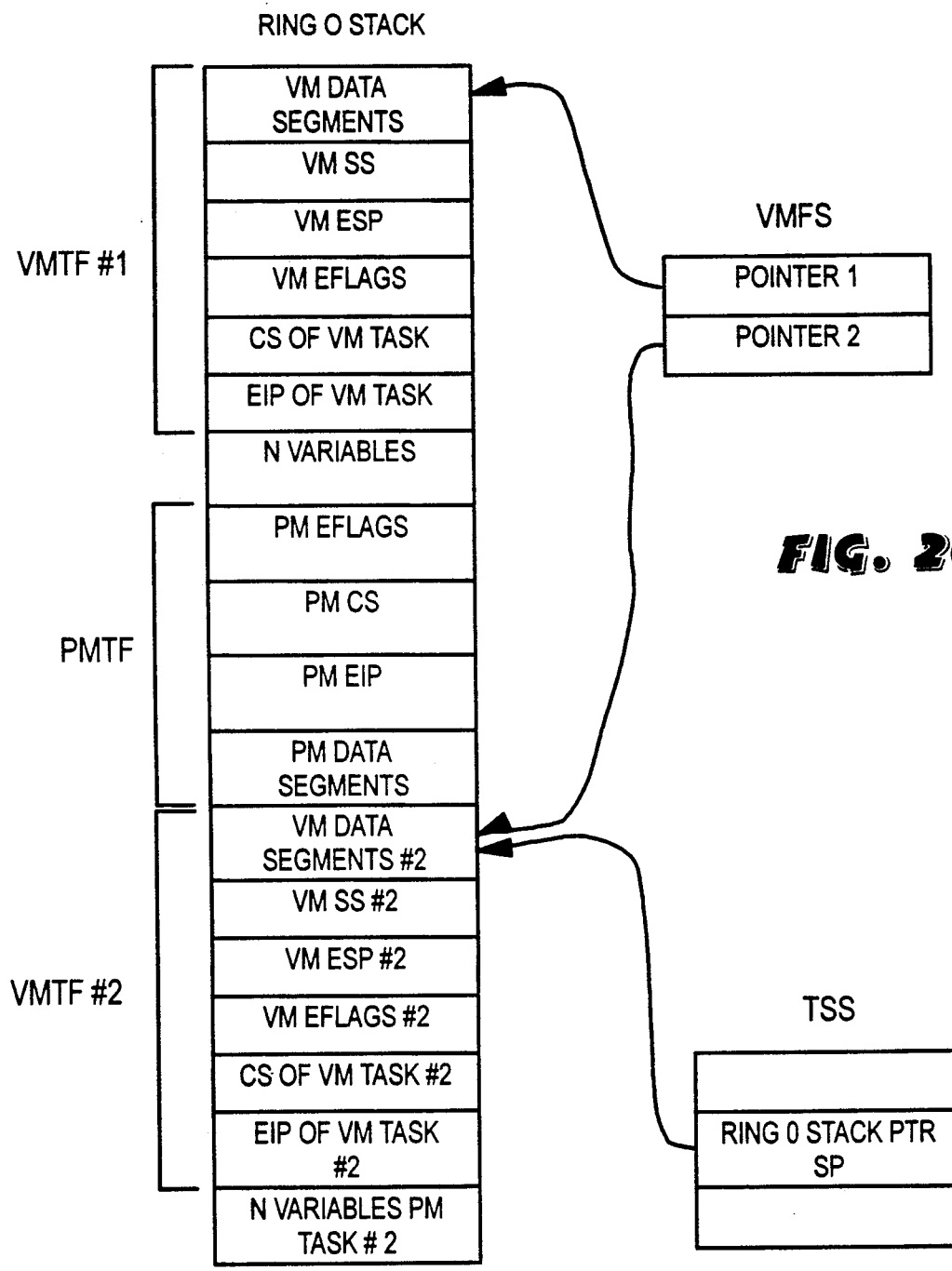

Here we assume for discussion purposes that the second exceptional condition which occurred in step 102 during the ISR was a software interrupt which requested a protected mode service. In this instance, the protected mode interrupt handler pushes a second pointer onto the VMFS to point to VMTF#2 in step 130, which is the last VMTF on the ring 0 stack. The protected mode interrupt handler then enables interrupts and dispatches the appropriate protected mode service routine in step 132. Referring now to FIG. 20, during execution of this second protected mode service routine in step 134, the routine uses the ring 0 stack as a local storage area, and a number n variables may generally be located on the ring 0 stack at any given time.

Figure 21:
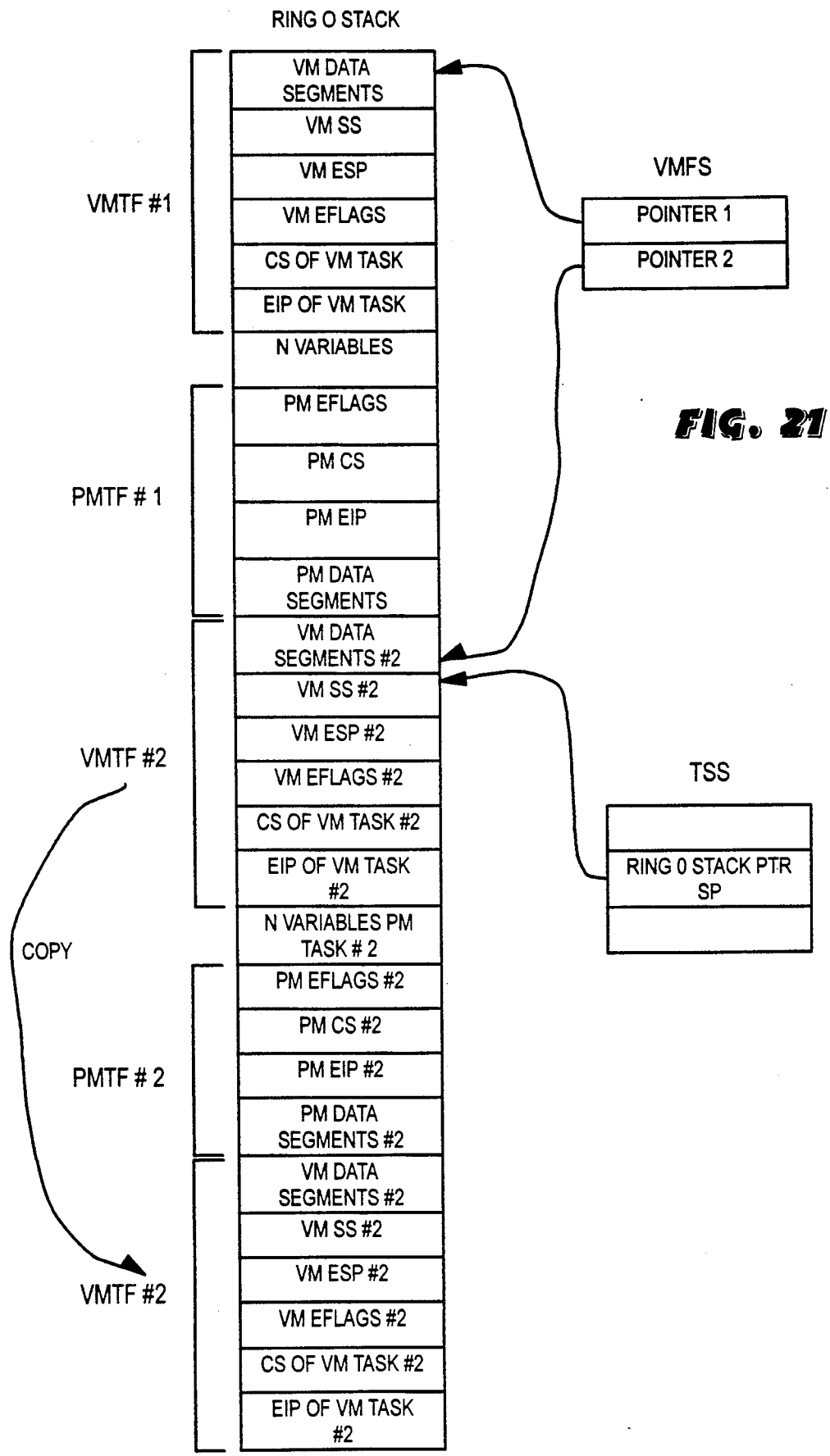

During execution of this second protected mode service, interrupts are enabled and an exceptional condition could occur in step 136. The procedure for handling an exceptional condition interrupt during this protected mode service is identical to the procedure used to handle the exceptional condition which occurred during the first protected mode service described above. However, it is deemed appropriate to demonstrate what would occur if an exceptional condition occurred during this second protected mode service to fully explain the nesting capabilities of the present invention. If an exceptional condition occurs during this second protected mode service in step 136, the 80386 processor places a protected mode IRET frame (PMTF) referred to as PMTF#2 on the ring 0 stack in step 138. Here we assume that the exceptional condition that occurred instep 136 is a hardware interrupt. The interrupt handler saves all of the current protected mode data segments on the top of the ring 0 stack in step 160. The protected mode interrupt handler then goes to the top of the VMFS to get a pointer to the last VMTF on the ring 0 stack in step 162, which in this instance is VMTF#2. VMTF#2 is copied to the top of the ring 0 stack in step 164 to create a new VMTF on top of the ring 0 stack. The ring 0 stack now appears as shown in FIG. 21.

Figure 22:
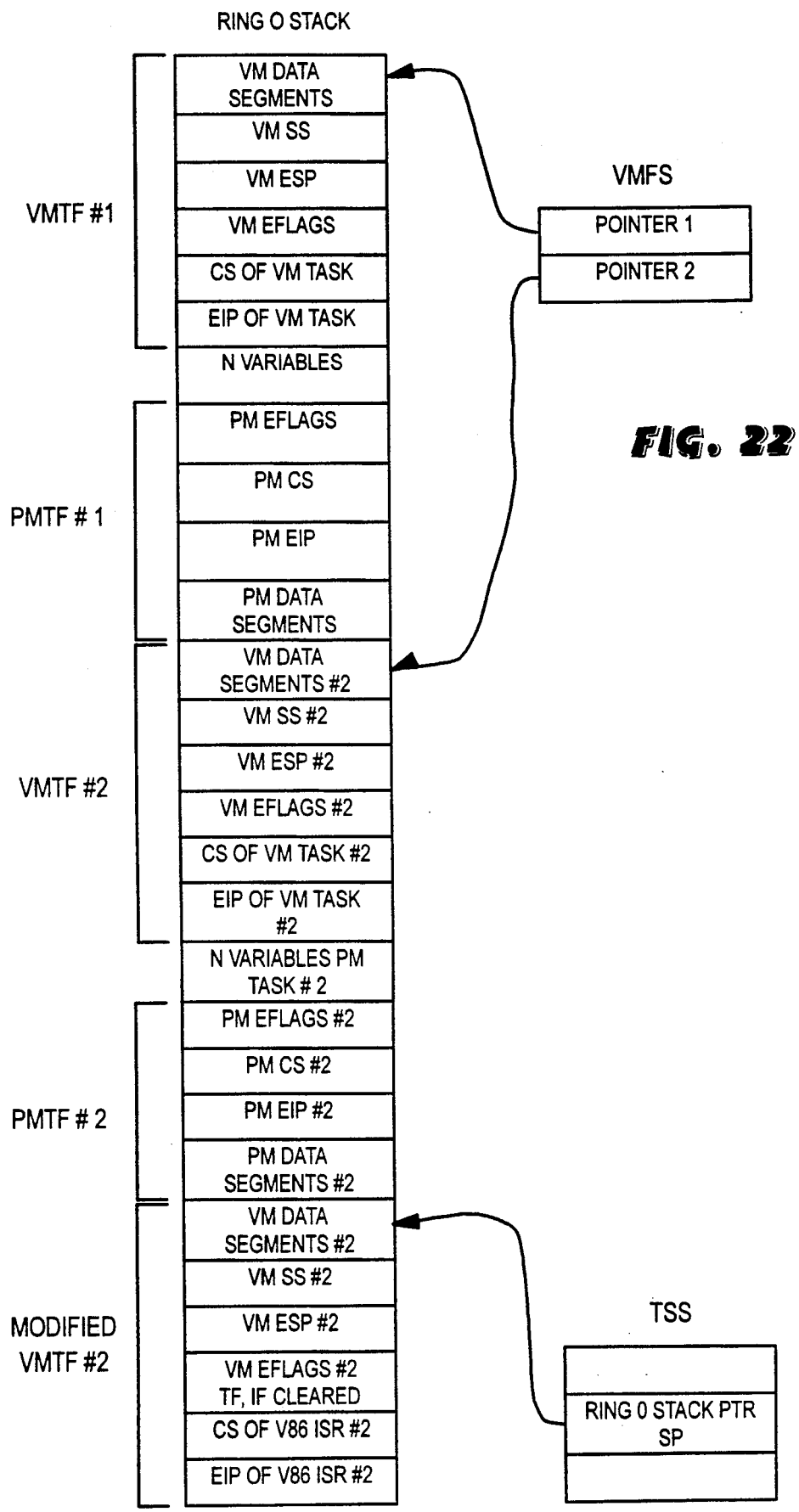

The protected mode interrupt handler then determines the segment:offset of the entry point to the V86 (or real mode) interrupt service routine required to service this second hardware interrupt from the interrupt vector table in step 166. The CS:EIP of the copied VMTF on the top of the ring 0 stack are modified in step 168 so that an IRET instruction will cause the 80386 to begin execution at this entry point. The interrupt handler also modifies the EFLAGS value on the ring 0 stack, clearing the TF and IF fits in step 168. The copied VMTF#2 is thus modified and is now referred to as modified VMTF#2 in FIG. 22. The ring 0 stack pointer in the task state segment is updated to point to modified VMTF#2 in step 170 so that, if a subsequent exceptional condition occurred during the upcoming ISR, the VMTF placed on the ring 0 stack by the ring transition would not overwrite VMTF#2. The ring 0 stack now appears as shown in FIG. 22.

Figure 23:
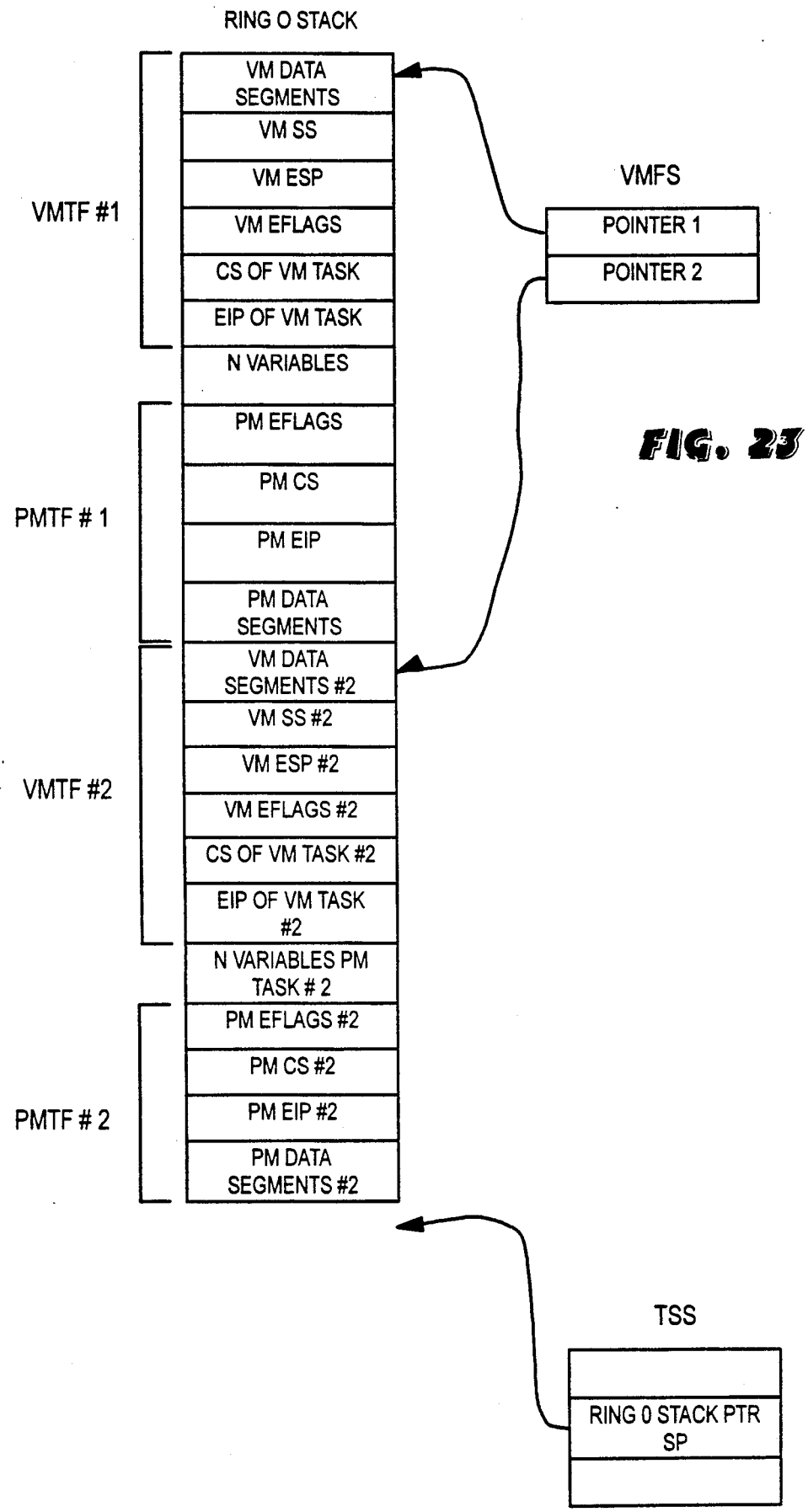

The V86 or ring 3 stack is appended with a pointer to an EHI routine in step 172 so that an IRET instruction executed at the end of the V86 interrupt service routine will trap back to protected mode. The 80386 then performs an IRET instruction in step 174 to pop the modified VMTF#2 off of the ring 0 stack and begin execution of a second V86 interrupt service routine as a V86 task in step 100 The ring 0 stack now appears as shown in FIG. 23.

During execution of the second V86 interrupt service routine, interrupts may be enabled and protected mode services are available. It is now assumed for discussion purposes that the second V86 interrupt service routine completes execution either without an exceptional condition occurring in step 102 or with any subsequent exceptional condition that might have occurred having completed. At the end of the second V86 interrupt service routine in step 180, the 80386 performs an IRET instruction in step 184 if the current V86 task is an ISR in step 182. If the current V86 ISR was invoked during an earlier V86 task or ISR, the IRET instruction pops the previous V86 state off of the ring 3 stack, and the processor resumes execution of the interrupted V86 task in step 100. However, here we assume that any V86 ISR's invoked during execution of other V86 ISR's have completed, and that the current V86 ISR was invoked from a protected mode service. In this instance the EHI code pointer appended on the ring 3 stack in step 172 will be on top of the ring 3 stack. The IRET instruction causes the processor to execute the V86 EHI code which traps back into protected mode in step 186.

Figure 24:
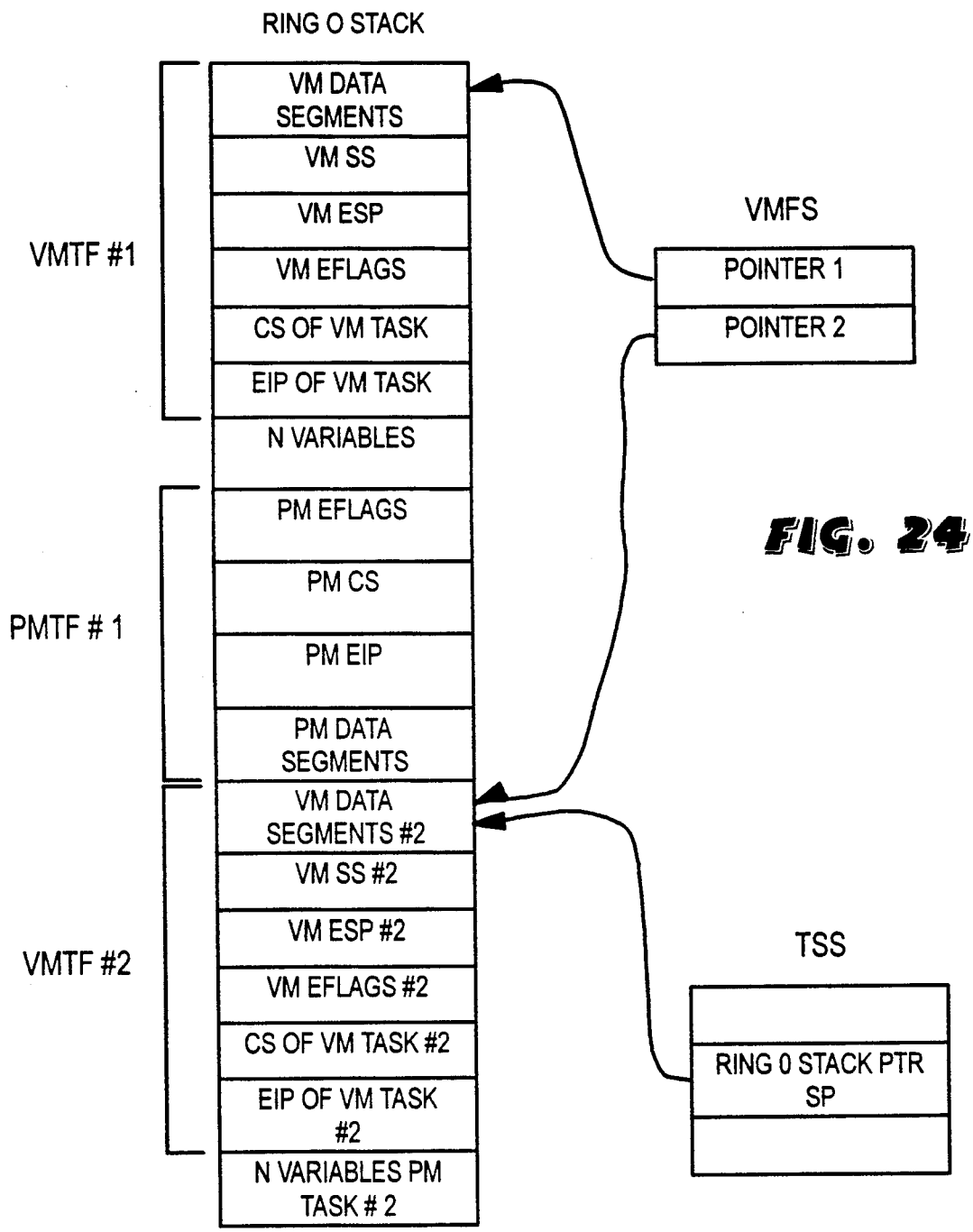

The trap back to protected mode caused by the software interrupt in the EHI code generates a VMTF on top of the ring 0 stack. The protected mode code handling this trap discards the VMTF in step 188 since it is simply an unwanted by-product of the trap to protected mode. As shown in FIG. 24, the protected mode code updates the ring 0 stack pointer in the TSS to the current value on the top of the VMFS in step 190. This is done so that the ring 0 stack pointer points to the most recent VMTF on the ring 0 stack. Thus if a hardware interrupt occurs during the resumed protected mode service, the ring 0 stack pointer could be used to copy the most recent VMTF to the top of the ring 0 stack to create a modified VMTF to enter V86 mode as was done in steps 162-174. The protected mode handler then restores the values held in the protected mode data segment registers for the protected mode service in step 192 and then performs an IRET instruction in step 194. The IRET instruction pops PMTF#2 from the top of the ring 0 stack and returns the 80386 to execution of the interrupted protected mode code of the second protected mode service routine in step 134. Interrupts are enabled when the 80386 resumes execution of the protected mode service since the interrupt flag stored in the EFLAGS register in PMTF#2 is set, and thus a hardware interrupt may occur. The ring 0 stack now appears as shown in FIG. 24.

Here it is assumed that the second protected mode service completes execution in step 146 either without an exceptional condition occurring in step 136 or with any subsequent exceptional condition having completed. The 80386 pops the most recent value on the VMFS in step 148 to determine the starting point of the most recent VMTF on the ring 0 stack. The processor then performs an IRET instruction in step 150 which pops the most recent VMTF, VMTF#2, off of the ring 0 stack. Since the VMTF popped off of the ring 0 stack is not the original VMTF, VMTF#1, the ring 0 stack is nested down multiple levels, and VMTF#2 is used to return to the first V86 ISR in step 100 which was previously interrupted. When the 80386 resumes execution of the V86 interrupt service routine in step 100, interrupts may be enabled and protected mode services are available. A request for a protected mode service in step 100 would cause steps 104-108, 130, and 132 to be repeated as described above.

Figure 25:
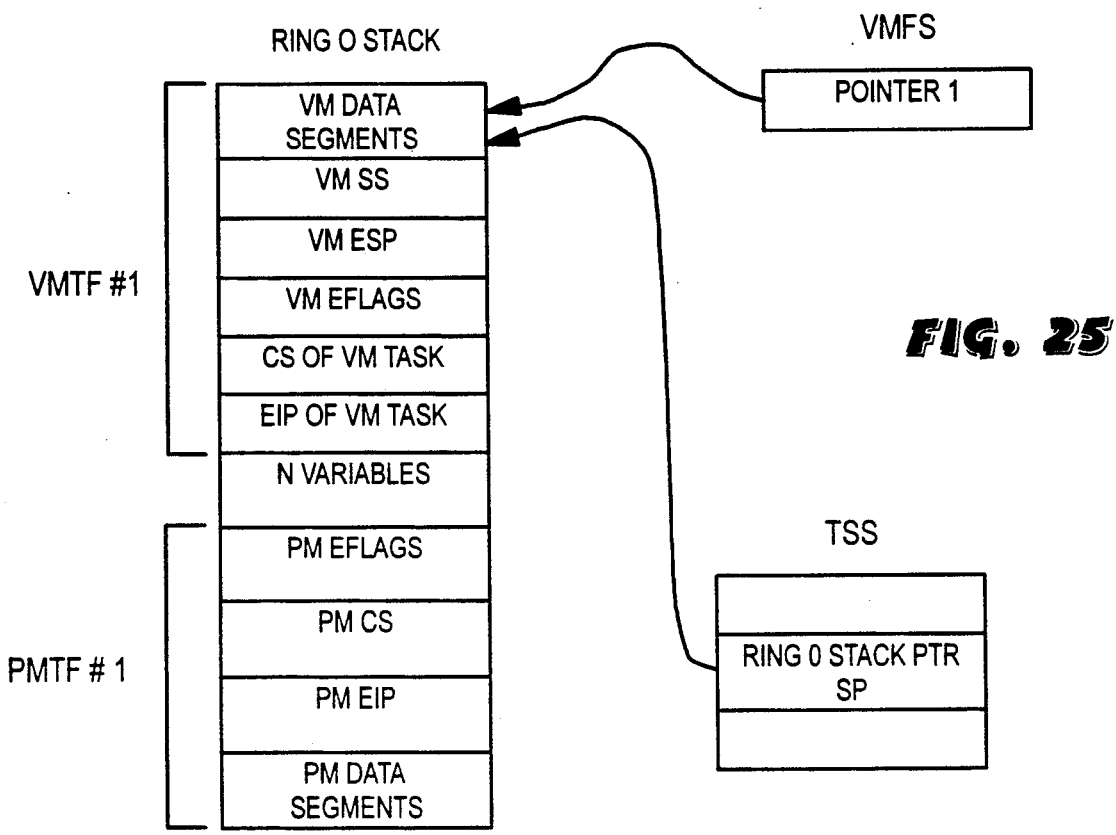
Figure 26:
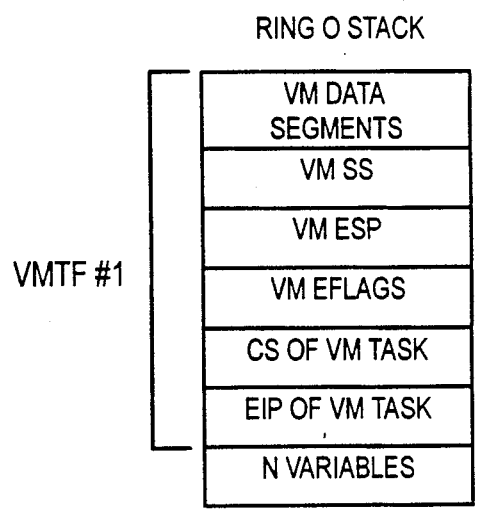

When the first V86 interrupt service routine completes in step 180, the 80386 performs an IRET instruction in step 184 which causes it to execute the V86 EHI code in step 186 which traps back into protected mode. The protected mode code handling the trap discards the VMTF created by the EHI code in step 188 and updates the ring 0 stack pointer in the TSS to point to the value on top of the VMFS, which is VMTF#1, in step 190. At this point, the ring 0 stack appears as shown in FIG. 25. The protected mode code then restores the data segment registers for the first protected mode service in step 192 and performs an IRET instruction in step 194 to pop PMTF#1 off of the ring 0 stack and return to the interrupted protected mode code of the first protected mode service routine in step 134. Interrupts are enabled when the protected mode service resumes in step 134, and a hardware interrupt in step 136 would cause the 80386 to repeat step 138, and steps 160-174. The ring 0 stack now appears as shown in FIG. 26.

Upon completion of the first protected mode service in step 146, the value on top of the VMFS is popped in step 148 and an IRET instruction pops VMTF#1 off of the ring 0 stack in step 150. The ring 0 stack is no longer nested down, and VMTF#1 returns the 80386 to the original V86 code which was first interrupted in step 100. When the original V86 task completes in step 180, since the original V86 task is not an ISR in step 182, the processor may begin execution of a new V86 task in step 100 or another task, if desired.

Therefore, a reentrant or interruptible protected mode kernel is provided according to the present invention which can service, in V86 mode, hardware interrupts which occur during execution of ring 0 protected mode code. This reduces the interrupt latency which can occur during the execution of a long protected mode service. The method according to the present invention allows interrupts to be nested down multiple levels, and this nesting is only limited by the size of the ring 0 stack used and the size of the VMFS.

The foregoing disclosure and description of the invention are illustrative and explanatory thereof, and various changes in the methods, algorithms or steps may be made without departing from the spirit of the invention.

What is claimed is:

1. A method for servicing exceptional conditions in a computer system utilizing a microprocessor having data registers, a first privilege level and a second privilege level, each privilege level having an associated stack, the microprocessor executing tasks operating at each privilege level having respective task state information, the computer system having a secondary stack and a pointer which points to the top of the second privilege level stack, the method comprising:

(a) transitioning from the first privilege level to the second privilege level to execute the second privilege level task;
   (b) retrieving the second privilege level stack top pointer after transitioning from the first privilege level to the second privilege level;
   (c) placing the first privilege level task state information on top of the second privilege level stack after retrieving the second privilege level stack top pointer;
   (d) placing a pointer to the first privilege level task state information on the secondary stack after placing the first privilege level task state information on the second privilege level stack;
   (e) enabling interrupts and executing the second privilege level task after placing said first privilege level task state information pointer on the secondary stack;
   (f) placing the second privilege level task state information on the second privilege level stack after an occurrence of an exceptional condition after enabling interrupts and beginning execution of the second privilege level task;
   (g) executing an exception handler after placing said second privilege level task state information if said exceptional condition is an exception and returning to execution of said second privilege level task in step (e) after completion of said exception handler;
   (h) saving certain data register values on the second privilege level stack after placing said second privilege level task state information if said exceptional condition is a hardware interrupt;
   (i) retrieving the most recent first privilege level task state information pointer from the secondary stack after saving said certain data register values;
   (j) copying the first privilege level task state information indicated by said most recent first privilege level task state information pointer to the top of the second privilege level stack after retrieving said most recent first privilege level task state information pointer;
   (k) determining the entry address of an interrupt service routine required to handle said hardware interrupt after saving said certain data register values;
   (l) modifying said copied first privilege level task state information to indicate execution at said entry address of said interrupt service routine after determining said entry address and copying said first privilege level task state information;
   (m) modifying the second privilege level stack top pointer to point to said copied and modified first privilege level task state information after modifying said copied first privilege level task state information;
   (n) beginning execution of said interrupt service routine at the first privilege level and removing said copied and modified first privilege level task state information from the second privilege level stack after modifying the second privilege level stack top pointer;
   (o) executing said first privilege level interrupt service routine after beginning execution, during which execution interrupts may be enabled, whereupon an exceptional condition occurring requesting a second privilege level task causes steps (a) through (e) to be repeated;
   (p) returning to the second privilege level after said interrupt service routine completes;
   (q) modifying the second privilege level stack top pointer to the pointer value most recently placed on the secondary stack after returning to the second privilege level;
   (r) retrieving the second privilege level task state information from the second privilege level stack after returning to the second privilege level;
   (s) returning execution to the second privilege level task after retrieving the second privilege level task state information, whereupon an exceptional condition occurring causes steps (f) through (o) to be repeated;
   (t) retrieving the most recent pointer from the top of the secondary stack upon completion of the second privilege level task; and
   (u) returning to the first privilege level task or interrupt service routine using the first privilege level task state information on the second privilege level stack pointed to by said pointer retrieved from the secondary stack in step (t) upon completion of the second privilege level task.

2. A method for servicing exceptional conditions in a computer system utilizing a microprocessor having data registers, a first privilege level and a second privilege level, each privilege level having an associated stack, the microprocessor executing tasks operating at each privilege level having respective task state information, the computer system having memory, a secondary stack, a pointer which points to the top of the second privilege level stack, and a programmable interrupt controller which includes an in-service register indicating the current hardware interrupt being serviced, wherein the computer system maintains a virtual copy of the in-service register in the memory, the method comprising:

(a) transitioning from the first privilege level to the second privilege level to execute the second privilege level task;

(b) retrieving the second privilege level stack top pointer after transitioning from the first privilege level to the second privilege level;

(c) placing the first privilege level task state information on top of the second privilege level stack after retrieving the second privilege level stack top pointer;

(d) placing a pointer to the first privilege level task state information on the secondary stack after placing the first privilege level task state information on the second privilege level stack;

(e) enabling interrupts and executing the second privilege level task after placing said first privilege level task state information pointer on the secondary stack;

(f) placing the second privilege level task state information on the second privilege level stack after an occurrence of an exceptional condition after enabling interrupts and beginning execution of the second privilege level task;

(g) checking the status of the in-service register virtual copy after placing said second privilege level task state information to determine if said exceptional condition is a hardware interrupt;

(h) saving certain data register values on the second privilege level stack if said exceptional condition is a hardware interrupt as determined in step (g);

(i) retrieving the most recent first privilege level task state information pointer from the secondary stack after saving said certain data register values;

(j) copying the first privilege level task state information indicated by said most recent first privilege level task state information pointer to the top of the second privilege level stack after retrieving said most recent first privilege level task state information pointer;

(k) determining the entry address of an interrupt service routine required to handle said hardware interrupt after saving said certain data register values;

(l) modifying said copied first privilege level task state information to indicate execution at said entry address of said interrupt service routine after determining said entry address and copying said first privilege level task state information;

(m) modifying the second privilege level stack top pointer to point to said copied and modified first privilege level task state information after modifying said copied first privilege level task state information;

(n) beginning execution of said interrupt service routine at the first privilege level and removing said copied and modified first privilege level task state information from the second privilege level stack after modifying the second privilege level stack top pointer;

(o) executing said first privilege level interrupt service routine after beginning execution, during which execution interrupts may be enabled, whereupon an exceptional condition occurring requesting a second privilege level task causes steps (a) through (e) to be repeated;

(p) returning to the second privilege level after said interrupt service routine completes;

(q) modifying the second privilege level stack top pointer to the pointer value most recently placed on the secondary stack after returning to the second privilege level;

(r) retrieving the second privilege level task state information from the second privilege level stack after returning to the second privilege level;

(s) returning execution to the second privilege level task after retrieving the second privilege level task state information, whereupon an exceptional condition occurring causes steps (f) through (o) to be repeated;

(t) retrieving the most recent pointer from the top of the secondary stack upon completion of the second privilege level task; and (u) returning to the first privilege level task or interrupt service routine using the first privilege level task state information on the second privilege level stack pointed to by said pointer retrieved from the secondary stack in step (t) upon completion of the second privilege level task.

3. The method of claims 1 or 2, further comprising:
appending a value to the first privilege level stack after saving said data register values in step (h), wherein said value causes execution to proceed to an end of interrupt routine which causes entry into the second privilege level when said value is popped off of the first privilege level stack, and
wherein said value is popped off of the first privilege level stack to return to the second privilege level in step (p).

4. The method of claim 3, wherein said returning to the second privilege level in step (p) places first privilege level task state information on the second privilege level stack, the method further comprising:
discarding said first privilege level task state information created by said returning to the second privilege level in step (p) after returning to the second privilege level.

5. The method of claims 1 or 2, wherein the second privilege level has a greater privilege than the first privilege level.

6. The method of claims 1 or 2, wherein the first privilege level task is executing prior to step (a), and
wherein said transitioning from the first privilege level to the second privilege level in step (a) is caused by an exceptional condition requesting the second privilege level task.

7. A method for servicing exceptional conditions in a computer system utilizing a microprocessor having data registers, a first privilege level and a second privilege level, each privilege level having an associated stack, the microprocessor executing tasks operating at each privilege level having respective task information, the computer system including a secondary stack and a pointer which points to the top of the second privilege level stack, the method comprising:

(a) transitioning from the first privilege level to the second privilege level to execute the second privilege level task;

(b) retrieving the second privilege level stack top pointer after transitioning from the first privilege level to the second privilege level;

(c) placing the first privilege level task information on the top of the second privilege level stack after retrieving the second privilege level stack top pointer;

(d) placing a pointer to the first privilege level task information on the secondary stack after placing the first privilege level task information on the second privilege level stack;

(e) enabling interrupts and executing the second privilege level task after placing said first privilege level task information pointer on the secondary stack;

(f) placing the second privilege level task information on the second privilege level stack after an occurrence of an exceptional condition after enabling interrupts and beginning execution of the second privilege level task;

(g) executing an exception handler after placing said second privilege level task state information if said exceptional condition is an exception and returning to execution of said second privilege level task in step (e) after completion of said exception handler;

(h) saving certain data register values on the second privilege level stack after placing said second privilege level task state information if said exceptional condition is a hardware interrupt;

(i) retrieving the most recent first privilege level task information pointer from the secondary stack after saving said certain data register values;

(j) copying the first privilege level task information indicated by said most recent first privilege level task information pointer to the top of the second privilege level stack after retrieving said most recent first privilege level task information pointer;

(k) determining the entry address of an interrupt service routine required to handle said hardware interrupt after saving said certain data register values;

(l) modifying said copied first privilege level task information to indicate execution at said entry address of said interrupt service routine after determining said entry address and copying said first privilege level task information;

(m) modifying the second privilege level stack top pointer to point to said copied and modified first privilege level task information after modifying said copied first privilege level task information;

(n) appending a value to the first privilege level stack after occurrence of said exceptional condition, wherein said value causes execution to proceed to an end of interrupt routine which causes entry into the second privilege level and placement of end of interrupt routine task information on the second privilege level stack when said value is popped off of the first privilege level stack;

(o) beginning execution of said interrupt service routine at the first privilege level and removing said copied and modified first privilege level task information from the second privilege level stack after modifying the second privilege level stack top pointer and appending said value to the first privilege level stack;

(p) executing said first privilege level interrupt service routine after beginning execution, during which execution interrupts may be enabled, whereupon an exceptional condition occurring which requests a second privilege level task causes steps (a) through (e) to be repeated;

(q) popping said value off of the first privilege level stack to execute said end of interrupt routine and return to the second privilege level upon completion of said first privilege level interrupt service routine;

(r) discarding said end of interrupt routine task information placed on the second privilege level stack by said entry to the second privilege level after returning to the second privilege level;

(s) modifying the second privilege level stack top pointer to the pointer value most recently placed on the secondary stack after returning to the second privilege level;

(t) restoring said saved certain second privilege level register values from the second privilege level stack after returning to the second privilege level;

(u) returning execution of the second privilege level task using the second privilege level task information placed on the second privilege level stack after restoring said saved certain second privilege level register values, whereupon an exceptional condition occurring causes steps (f) through (p) to be repeated;

(v) retrieving the most recent pointer from the top of the secondary stack upon completion of the second privilege level task; and (w) returning to the first privilege level task or interrupt service routine using the first privilege level task state information on the second privilege level stack pointed to by said pointer retrieved from the secondary stack in step (v) upon completion of the second privilege level task.

8. A method for servicing exceptional conditions in a computer system utilizing a microprocessor having data registers, a first privilege level and a second privilege level, each privilege level having an associated stack, the microprocessor executing tasks operating at each privilege level having respective task information, the computer system having memory, a secondary stack, a pointer which points to the top of the second privilege level stack, and a programmable interrupt controller which includes an in-service register indicating the current hardware interrupt being serviced, wherein the computer system maintains a virtual copy of the in-service register in the memory, the method comprising:

(a) transitioning from the first privilege level to the second privilege level to execute the second privilege level task;

(b) retrieving the second privilege level stack top pointer after transitioning from the first privilege level to the second privilege level;

(c) placing the first privilege level task information on the top of the second privilege level stack after retrieving the second privilege level stack top pointer;

(d) placing a pointer to the first privilege level task information on the secondary stack after placing the first privilege level task information on the second privilege level stack;

(e) enabling interrupts and executing the second privilege level task after placing said first privilege level task information pointer on the secondary stack;

(f) placing the second privilege level task information on the second privilege level stack after an occurrence of an exceptional condition after enabling interrupts and beginning execution of the second privilege level task;

(g) checking the status of the in-service register virtual copy after placing said second privilege level task state information to determine if said exceptional condition is a hardware interrupt;
(h) saving certain data register values on the second privilege level stack if said exceptional condition is a hardware interrupt as determined in step (g);
(i) retrieving the most recent first privilege level task information pointer from the secondary stack after saving said certain data register values;
(j) copying the first privilege level task information indicated by said most recent first privilege level task information pointer to the top of the second privilege level stack after retrieving said most recent first privilege level task information pointer;
(k) determining the entry address of an interrupt service routine required to handle said hardware interrupt after saving said certain data register values;
(l) modifying said copied first privilege level task information to indicate execution at said entry address of said interrupt service routine after determining said entry address and copying said first privilege level task information;
(m) modifying the second privilege level stack top pointer to point to said copied and modified first privilege level task information after modifying said copied first privilege level task information;
(n) appending a value to the first privilege level stack after occurrence of said exceptional condition, wherein said value causes execution to proceed to an end of interrupt routine which causes entry into the second privilege level and placement of end of interrupt routine task information on the second privilege level stack when said value is popped off of the first privilege level stack;
(o) beginning execution of said interrupt service routine at the first privilege level and removing said copied and modified first privilege level task information from the second privilege level stack after modifying the second privilege level stack top pointer and appending said value to the first privilege level stack;
(p) executing said first privilege level interrupt service routine after beginning execution, during which execution interrupts may be enabled, whereupon an exceptional condition occurring which requests a second privilege level task causes steps (a) through (e) to be repeated;
(q) popping said value off of the first privilege level stack to execute said end of interrupt routine and return to the second privilege level upon completion of said first privilege level interrupt service routine;
(r) discarding said end of interrupt routine task information placed on the second privilege level stack by said entry to the second privilege level after returning to the second privilege level;
(s) modifying the second privilege level stack top pointer to the pointer value most recently placed on the secondary stack after returning to the second privilege level;
(t) restoring said saved certain second privilege level register values from the second privilege level stack after returning to the second privilege level;
(u) returning execution to the second privilege level task using the second privilege level task information placed on the second privilege level stack after restoring said saved certain second privilege level register values, whereupon an exceptional condition occurring causes steps (f) through (p) to be repeated;
(v) retrieving the most recent pointer from the top of the secondary stack upon completion of the second privilege level task; and
(w) returning to the first privilege level task or interrupt service routine using the first privilege level task state information on the second privilege level stack pointed to by said pointer retrieved from the secondary stack in step (v) upon completion of the second privilege level task.

9. The method of claims 7 or 8, wherein the second privilege level has a greater privilege than the first privilege level.

10. The method of claims 7 or 8, wherein said exceptional condition of step (p) which causes said transitioning from the first privilege level to the second privilege level is a software interrupt requesting a protected mode service.

11. A computer system utilizing a microprocessor having data registers, a first privilege level and a second privilege level, each privilege level having an associated stack, the microprocessor executing tasks operating at each privilege level having respective task state information, the computer system including a secondary stack and a pointer which points to the top of the second privilege level stack, the computer system comprising:
(a) means for transitioning from the first privilege level to the second privilege level to execute the second privilege level task;
(b) means for placing the first privilege level task state information on the top of the second privilege level stack utilizing the second privilege level stack top pointer;
(c) means for placing a pointer to the first privilege level task state information on the secondary stack after placement of said first privilege level task state information;
(d) means for enabling interrupts and executing the second privilege level task after placement of said first privilege level task state information pointer on the secondary stack;
(e) means for placing the second privilege level task state information on the second privilege level stack after an occurrence of an exceptional condition during execution of the second privilege level task;
(f) means for invoking an exception handler routine after placement of said second privilege level task state information if said exceptional condition is an exception;
(ff) means for returning to execution of said second privilege level task upon completion of said exception handler routine;
(g) means for saving certain data register values on the second privilege level stack after placement of said second privilege level task state information if said exceptional condition is a hardware interrupt;
(h) means for copying the first privilege level task state information indicated by said first privilege level task state information pointer to the top of the second privilege level stack after the saving of said certain data register values;
(i) means for determining the entry address of an interrupt service routine required to handle said hardware interrupt after the saving of said certain data register values;

(j) means for modifying said copied first privilege level task state information to indicate execution at said entry address of said interrupt service routine after the determination of said entry address and the copying of said first privilege level task state information;

(k) means for modifying the second privilege level stack top pointer to point to said copied and modified first privilege level task state information after modifying said copied first privilege level task state information;

(l) means for beginning execution of said interrupt service routine at the first privilege level, and for removing said copied and modified first privilege level task state information from the second privilege level stack;

(m) means for enabling interrupts during said interrupt service routine, whereupon an exceptional condition occurring requesting a second privilege level task causes said means (a) through (d) to operate;

(n) means for returning to the second privilege level upon completion of said first privilege level interrupt service routine;

(o) means for modifying the second privilege level stack top pointer to the pointer value most recently placed on the secondary stack after returning to the second privilege level;

(oo) means for retrieving the second privilege level task state information from the second privilege level stack after returning to the second privilege level;

(p) means for returning the microprocessor to execution of the second privilege level task using the second privilege level task state information saved on the second privilege level stack, whereupon an exceptional condition occurring requesting a first privilege level interrupt service routine causes said means (e) through (m) to operate;

(q) means for retrieving the most recent pointer from the top of the secondary stack upon completion of said second privilege level task; and (r) means for returning the microprocessor to execution of the first privilege level task or interrupt service routine using the first privilege level task state information on the second privilege level stack pointed to by said most recent pointer retrieved from the secondary stack.

12. A computer system utilizing a microprocessor having data registers, a first privilege level and a second privilege level, each privilege level having an associated stack, the microprocessor executing tasks operating at each privilege level having respective task state information, the computer system including memory, a secondary stack, a pointer which points to the top of the second privilege level stack, and a programmable interrupt controller which includes an in-service register indicating the current hardware interrupt being serviced, the computer system comprising:

(aa) means for maintaining a virtual copy of the in-service register in the memory;

(a) means for transitioning from the first privilege level to the second privilege level to execute the second privilege level task;

(b) means for placing the first privilege level task state information on the top of the second privilege level stack utilizing the second privilege level stack top pointer;

(c) means for placing a pointer to the first privilege level task state information on the secondary stack after placement of said first privilege level task state information;

(d) means for enabling interrupts and executing the second privilege level task after placement of said first privilege level task state information pointer on the secondary stack;

(e) means for placing the second privilege level task state information on the second privilege level stack after an occurrence of an exceptional condition during execution of the second privilege level task;

(f) means for determining after the placement of said second privilege level task state information if said exceptional condition is a hardware interrupt by checking the status of the in-service register virtual copy;

(g) means for saving certain data register values on the second privilege level stack if said exceptional condition is a hardware interrupt;

(h) means for copying the first privilege level task state information indicated by said first privilege level task state information pointer to the top of the second privilege level stack after the saving of said certain data register values;

(i) means for determining the entry address of an interrupt service routine required to handle said hardware interrupt after the saving of said certain data register values;

(j) means for modifying said copied first privilege level task state information to indicate execution at said entry address of said interrupt service routine after the determination of said entry address and the copying of said first privilege level task state information;

(k) means for modifying the second privilege level stack top pointer to point to said copied and modified first privilege level task state information after modifying said copied first privilege level task state information;

(l) means for beginning execution of said interrupt service routine at the first privilege level and for removing said copied and modified first privilege level task state information from the second privilege level stack;

(m) means for enabling interrupts during said interrupt service routine, whereupon an exceptional condition occurring requesting a second privilege level task causes said means (a) through (d) to operate;

(n) means for returning to the second privilege level upon completion of said first privilege level interrupt service routine;

(o) means for modifying the second privilege level stack top pointer to the pointer value most recently placed on the secondary stack after returning to the second privilege level;

(oo) means for retrieving the second privilege level task state information from the second privilege level stack after returning to the second privilege level;

(p) means for returning the microprocessor to execution of the second privilege level task using the second privilege level task state information saved on the second privilege level stack, whereupon an exceptional condition occurring requesting a first privilege level interrupt service routine causes said means (e) through (m) to operate;

(q) means for retrieving the most recent pointer from the top of the secondary stack upon completion of said second privilege level task; and (r) means for returning the microprocessor to execution of the first privilege level task or interrupt service routine using the first privilege level task state information on the second privilege level stack pointed to by said most recent pointer retrieved from the secondary stack.

13. The computer systems of claims 11 or 12, further comprising:

means for appending a value to the first privilege level stack after operation of said certain data register value placing means (g), wherein said value causes execution to proceed to an end of interrupt routine which causes entry into the second privilege level when said value is popped off of the first privilege level stack, and said second privilege level returning means (n) pops said value off of the first privilege level stack to return to the second privilege level.

14. The computer system of claims 13, wherein said second privilege level returning means (n) places first privilege level task state information on the second privilege level stack, the computer system further comprising:

means for discarding said first privilege level task state information placed on said second privilege level stack by said returning means.

15. A method for allowing an operating system kernel to service exceptional conditions in virtual 8086 mode during execution of ring 0 code in a computer system having an 80386-compatible microprocessor which includes a virtual 8086 mode and a protected mode of operation, a high privilege level referred to as ring 0 which has associated with it a ring 0 stack, a low privilege level referred to as ring 3 which has associated with it a ring 3 stack, and data registers, the computer system further including a secondary stack and memory which includes a virtual 8086 task operating at ring 3 level and a task state segment associated with the task which includes a ring 0 stack pointer that points to the beginning of the ring 0 stack, the ring 0 code and the virtual 8086 task each having an associated task state, the method comprising:

(a) transitioning from virtual 8086 mode to protected mode to execute the ring 0 code;

(b) retrieving the ring 0 stack pointer after transitioning from virtual 8086 mode to protected mode;

(c) placing the virtual 8086 task state on the ring 0 stack after retrieving the ring 0 stack pointer;

(d) pushing a pointer to said virtual 8086 task state on the secondary stack after placing said virtual 8086 task state;

(e) enabling interrupts and beginning execution of said ring 0 code after pushing said pointer;

(f) saving the ring 0 code task state on the ring 0 stack after occurrence of an exceptional condition after enabling interrupts and beginning execution;

(g) executing an exception handler after saving the ring 0 code task state if said exceptional condition is an exception and returning to execution of said ring 0 code in step (e) after completion of said exception handler;

(h) saving current data register values on the ring 0 stack after saving the ring 0 code task state if said exceptional condition is a hardware interrupt;

(i) retrieving the most recent virtual 8086 task state pointer on the secondary stack after saving said data register values;

(j) copying the virtual 8086 task state pointed to by said most recent virtual 8086 task state pointer on the top of the ring 0 stack after retrieving said most recent virtual 8086 task state pointer;

(k) determining the entry address of an interrupt service routine required to service said hardware interrupt after occurrence of said exceptional condition;

(l) modifying said copied virtual 8086 task state to indicate execution at said interrupt service routine entry address after determining said entry address;

(m) modifying the ring 0 stack pointer to point to said copied and modified virtual 8086 task state on the ring 0 stack after copying said virtual 8086 task state;

(n) appending a pointer to the ring 3 stack after occurrence of said exceptional condition, wherein said ring 3 stack pointer causes execution to proceed to an end of interrupt routine that traps back to protected mode and further causes end of interrupt routine task information to be placed on the ring 0 stack;

(o) entering virtual 8086 mode and beginning execution of said interrupt service routine after appending said pointer;

(p) executing the interrupt service routine, during which time interrupts may be enabled, wherein an exceptional condition occurring during said interrupt service routine causes steps (a) through (e) to be repeated;

(q) popping said ring 3 stack pointer off of the ring 3 stack to execute said end of interrupt routine and return to protected mode after completion of said interrupt service routine;

(r) discarding said end of interrupt routine task information placed on the ring 0 stack by said entry to protected mode after returning to protected mode;

(s) modifying the ring 0 stack pointer to the pointer value most recently placed on the secondary stack after returning to protected mode;

(t) restoring said saved data register values from the ring 0 stack after returning to protected mode;

(u) returning execution to the ring 0 code using the ring 0 task state on the ring 0 stack after restoring said saved data register values, wherein an exceptional condition would cause steps (f) through (p) to be repeated;

(v) retrieving the most recent pointer from the top of the secondary stack upon completion of the ring 0 code; and (w) returning to the virtual 8086 mode task or interrupt service routine using the virtual 8086 task state information on the ring 0 stack pointed to by said most recent pointer retrieved from the secondary stack in step (v) after completion of the ring 0 code.

16. A method for allowing an operating system kernel to service exceptional conditions in virtual 8086 mode during execution of ring 0 code in a computer system having an 80386-compatible microprocessor which includes a virtual 8086 mode and a protected mode of operation, a high privilege level referred to as ring 0 which has associated with it a ring 0 stack, a low privilege level referred to as ring 3 which has associated with it a ring 3 stack, and data registers, the computer system further including a secondary stack, memory, a programmable interrupt controller which includes an in-service register indicating the current hardware interrupt being serviced, wherein the computer system maintains a virtual copy of the in-service register in the memory, wherein the memory further includes a virtual 8086 task operating at ring 3 level and a task state segment associated with the task which includes a ring 0 stack pointer that points to the beginning of the ring 0 stack, the ring 0 code and the virtual 8086 task each having an associated task state, the method comprising:

(a) transitioning from virtual 8086 mode to protected mode to execute the ring 0 code;

(b) retrieving the ring 0 stack pointer after transitioning from virtual 8086 mode to protected mode;

(c) placing the virtual 8086 task state on the ring 0 stack after retrieving the ring 0 stack pointer;

(d) pushing a pointer to said virtual 8086 task state on the secondary stack after placing said virtual 8086 task state;

(e) enabling interrupts and beginning execution of said ring 0 code after pushing said pointer;

(f) saving the ring 0 code task state on the ring 0 stack after occurrence of an exceptional condition after enabling interrupts and beginning execution;

(g) checking the status of the in-service register virtual copy after saving said ring 0 code task state to determine if said exceptional condition is a hardware interrupt;

(h) saving certain data register values on the ring 0 stack if said exceptional condition is a hardware interrupt as determined in step (g);

(i) retrieving the most recent virtual 8086 task state pointer on the secondary stack after saving said certain data register values;

(j) copying the virtual 8086 task state pointed to by said most recent virtual 8086 task state pointer on the top of the ring 0 stack after retrieving said most recent virtual 8086 task state pointer;

(k) determining the entry address of an interrupt service routine required to service said hardware interrupt after occurrence of said exceptional condition;

(l) modifying said copied virtual 8086 task state to indicate execution at said interrupt service routine entry address after determining said entry address;

(m) modifying the ring 0 stack pointer to point to said copied and modified virtual 8086 task state on the ring 0 stack after copying said virtual 8086 task state;

(n) appending a pointer to the ring 3 stack after occurrence of said exceptional condition, wherein said ring 3 stack pointer causes execution to proceed to an end of interrupt routine that traps back to protected mode and further causes end of interrupt routine task information to be placed on the ring 0 stack;

(o) entering virtual 8086 mode and beginning execution of said interrupt service routine after appending said pointer;

(p) executing the interrupt service routine, during which time interrupts may be enabled, wherein an exceptional condition occurring during said interrupt service routine causes steps (a) through (e) to be repeated;

(q) popping said ring 3 stack pointer off of the ring 3 stack to execute said end of interrupt routine and return to protected mode after completion of said interrupt service routine;

(r) discarding said end of interrupt routine task information placed on the ring 0 stack by said entry to protected mode after returning to protected mode;

(s) modifying the ring 0 stack pointer to the pointer value most recently placed on the secondary stack after returning to protected mode;

(t) restoring said saved data register values from the ring 0 stack after returning to protected mode;

(u) returning execution to the ring 0 code using the ring 0 task state on the ring 0 stack after restoring said saved data register values, wherein an exceptional condition would cause steps (f) through (p) to be repeated;

(v) retrieving the most recent pointer from the top of the secondary stack upon completion of the ring 0 code; and (w) returning to the virtual 8086 mode task or interrupt service routine using the virtual 8086 task state information on the ring 0 stack pointed to by said most recent pointer retrieved from the secondary stack in step (v) after completion of the ring 0 code.

* * * * *

UNITED STATES PATENT AND TRADEMARK OFFICE
CERTIFICATE OF CORRECTION

PATENT NO. : 5,303,378
DATED : April 12, 1994
INVENTOR(S) : Leonardo Cohen

It is certified that error appears in the above-identified patent and that said Letters Patent is hereby corrected as shown below:

In col. 43, line 2, please replace "With" with --with--.

Signed and Sealed this

Twenty-sixth Day of July, 1994

Attest:

BRUCE LEHMAN

Attesting Officer    Commissioner of Patents and Trademarks